US009692729B1

(12) United States Patent
Chen et al.

(10) Patent No.: US 9,692,729 B1
(45) Date of Patent: Jun. 27, 2017

(54) GRACEFUL MIGRATION OF ISOLATED VIRTUAL NETWORK TRAFFIC

(71) Applicant: Amazon Technologies, Inc., Seattle, WA (US)

(72) Inventors: Po-Chun Chen, Herndon, VA (US); Justin Thomas Smith, Reston, VA (US); Daniel Thomas Robinson, Herndon, VA (US); Ali Poonsakvarasan, Centreville, VA (US)

(73) Assignee: Amazon Technologies, Inc., Reno, NV (US)

( * ) Notice: Subject to any disclaimer, the term of this patent is extended or adjusted under 35 U.S.C. 154(b) by 100 days.

(21) Appl. No.: 14/625,539

(22) Filed: Feb. 18, 2015

(51) Int. Cl.
 *H04L 29/06* (2006.01)
 *H04L 12/24* (2006.01)
 *H04L 12/26* (2006.01)
 *H04L 12/911* (2013.01)

(52) U.S. Cl.
 CPC ...... *H04L 63/0272* (2013.01); *H04L 41/0813* (2013.01); *H04L 43/04* (2013.01); *H04L 47/70* (2013.01)

(58) Field of Classification Search
 None
 See application file for complete search history.

(56) References Cited

U.S. PATENT DOCUMENTS

| 7,072,346 | B2 | 7/2006 | Hama |  |
|---|---|---|---|---|
| 7,463,639 | B1 * | 12/2008 | Rekhter | H04L 12/4641 370/409 |
| 7,633,961 | B2 | 12/2009 | Raut et al. | |
| 7,903,553 | B2 | 3/2011 | Liu | |
| 8,339,973 | B1 * | 12/2012 | Pichumani | H04L 43/10 370/248 |
| 8,724,642 | B2 | 5/2014 | Miller et al. | |
| 2002/0133534 | A1 * | 9/2002 | Forslow | H04L 12/4641 709/200 |
| 2003/0123446 | A1 * | 7/2003 | Muirhead | H04L 12/4641 370/392 |
| 2006/0165087 | A1 * | 7/2006 | Page | H04L 12/4633 370/395.3 |

(Continued)

OTHER PUBLICATIONS

Rajan, Govinda; Nooren, Pieter; Armengol, Antonio J. Elizondo; Foglar, Andreas. Policy Based QoS Architecture in MUSE. Proceedings, 25th IEEE International Conference on Computer Communications. INFOCOM 2006. http://ieeexplore.ieee.org/stamp/stamp.jsp?arnumber=4146751.*

(Continued)

*Primary Examiner* — Jeremiah Avery
(74) *Attorney, Agent, or Firm* — Robert C. Kowert; Meyertons, Hood, Kivlin, Kowert & Goetzel, P.C.

(57) ABSTRACT

A connectivity manager (CM) of a provider network selects, from a plurality of ERGs (edge resource groups), a particular ERG comprising an edge router and a network marker translation agent to be used for routing traffic between a resource collection of a VCS (virtual computing service) and a client network. The CM detects a condition that triggers the selection of a second ERG to be used for at least a subset of the resource collection's traffic, and initiates a set of configuration changes to enable the use of the second ERG for connectivity between the first resource collection and the client network.

20 Claims, 15 Drawing Sheets

(56) References Cited

U.S. PATENT DOCUMENTS

| | | | |
|---|---|---|---|
| 2006/0233166 A1* | 10/2006 | Bou-Diab | H04L 63/08 370/389 |
| 2006/0233180 A1* | 10/2006 | Serghi | H04L 29/06 370/401 |
| 2007/0140250 A1* | 6/2007 | McAllister | H04L 12/4645 370/392 |
| 2012/0102188 A1* | 4/2012 | Shah | H04L 12/185 709/224 |
| 2015/0036480 A1* | 2/2015 | Huang | H04L 41/0663 370/220 |
| 2015/0350912 A1* | 12/2015 | Head | H04W 12/08 726/4 |
| 2015/0363423 A1* | 12/2015 | Utgikar | H04L 67/1095 707/827 |
| 2016/0156718 A1* | 6/2016 | Allan | H04L 67/10 709/228 |

OTHER PUBLICATIONS

Shenoy, Nirmala; Yuksel, Murat; Gupta, Aparna; Kar, Koushik; Perotti, Victor; Karir, Manish. RAIDER: Responsive Architecture for Inter-Domain Economics and Routing. 2010 IEEE GLOBECOM Workshops (GC Wkshps). http://ieeexplore.ieee.org/stamp/stamp.jsp?arnumber=5700334.*

Wang, Chao; Miao, Lianghua; Xie, Bin; Tianzhou Chen. An Application Mapping Scheme over Distributed Reconfigurable System. 2009 15th International Conference on Parallel and Distributed Systems (ICPADS). http://ieeexplore.ieee.org/stamp/stamp.jsp?arnumber=5395337.*

Amazon Web Services, "AWS Direct Connect User Guide", API Version, Oct. 22, 2013, pp. 1-64.

Amazon Web Services, "Amazon Virtual Private Cloud Network Administrator Guide" API Version, Oct. 1, 2014, pp. 1-125.

Amazon Web Services, "Amazon Virtual Private Cloud VPC Peering Guide", API Version, Oct. 1, 2014; pp. 1-22.

Amazon Web Services, "Amazon Virtual Private Cloud User Guide", API Version, Oct. 1, 2014, pp. 1-165.

U.S. Appl. No. 14/625,537, filed Feb. 18, 2015, Po-Chun Chen.

U.S. Appl. No. 14/274,546, filed Jun. 12, 2014, Upendra Bhalchandra Shevade.

U.S. Appl. No. 14/274,534, filed Jun. 12, 2014, Upendra Bhalchandra Shevade.

U.S. Appl. No. 14/18160, filed Feb. 18, 2014, Shuai Ye.

U.S. Appl. No. 14/192,476, filed Feb. 27, 2014, Shuai Ye.

* cited by examiner

GRACEFUL MIGRATION OF ISOLATED VIRTUAL NETWORK TRAFFIC

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, including public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

In some data centers that have been set up to provide virtualized computing and/or storage facilities to external customers, a set of resources at the data center may be dynamically divided into resource pools, with each pool being made available for exclusive use by a given customer for designated periods of time. In one scenario, an isolated virtual network (IVN) comprising numerous virtual machines (sometimes called "compute instances") and/or other devices may be set up or effected for a customer at a provider network, and the customer may be granted substantial networking configuration flexibility for the IVN. For example, customers may assign IP addresses of their choice with the isolated virtual network, set up subnets and routes, and so on, in a manner very similar to the way that network configuration settings could be selected at a customer-owned facility. In order to support secure connectivity between the compute instances of a particular IVN and a client network outside the provider network, various techniques may be supported, such as the use of VPN (virtual private network) connections and/or the use of dedicated direct physical links between client-owned routers and provider network-owned routers. The provider network operator may have to configure a number of different layers of networking intermediary devices (such as edge routers, network marker translation engines, internal routers and the like) to enable traffic to flow between the IVNs and the client networks. At least some of the intermediary devices may have built-in limitations regarding the number of different IVNs that can be supported and/or the amount of traffic that can be supported, making it difficult for an operator to provision network resources appropriately to handle a growing customer base with widely varying traffic needs.

Figure 1:
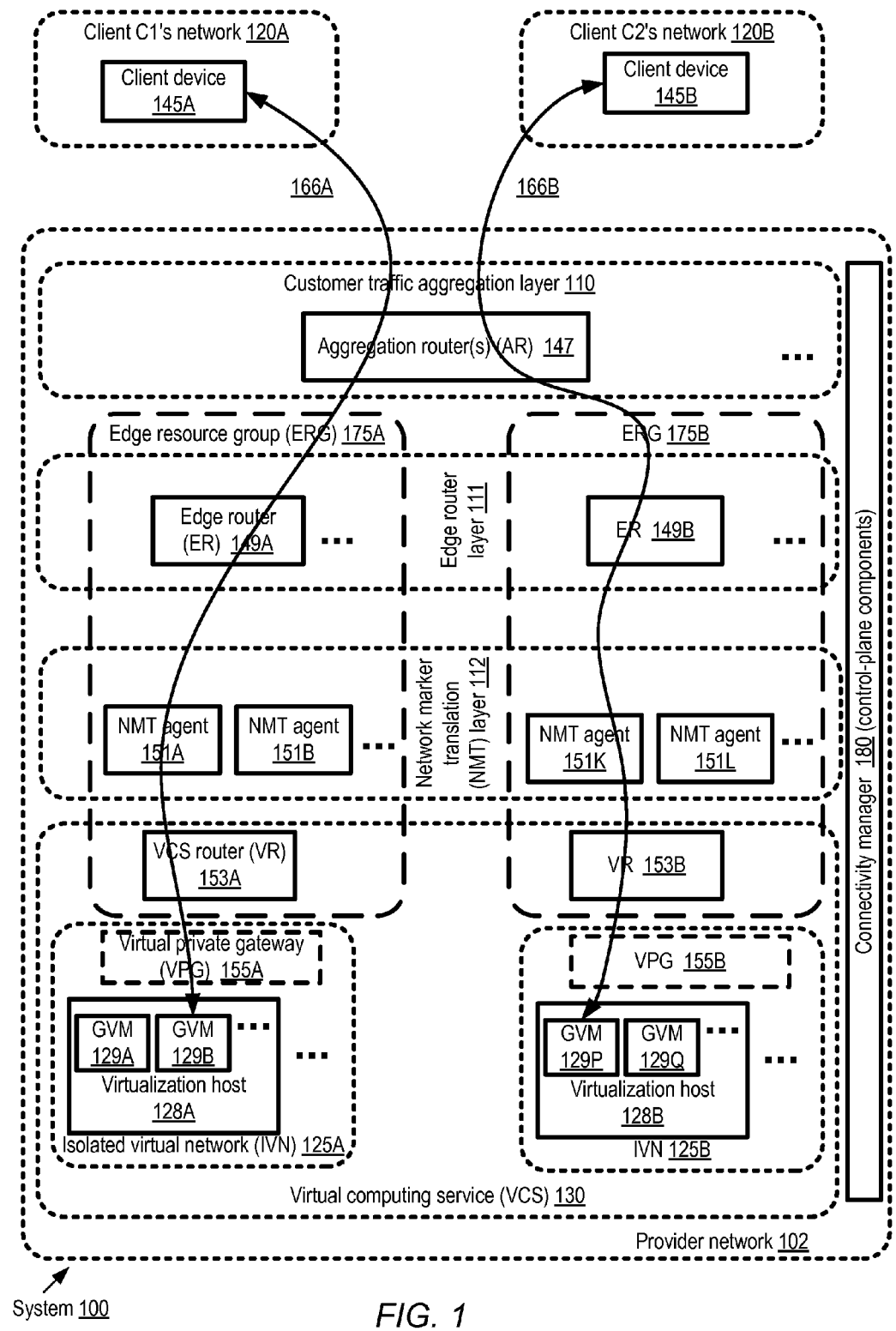
FIG. 1 illustrates an example system in which some of the provider network resources used for connectivity to and from isolated virtual networks (IVNs) may be organized into independent edge resource groups (ERGs), such that routing metadata need not be shared across ERG boundaries, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for partitioning a subset of networking resources of a provider network into a plurality of edge resource groups (ERGs), and using the ERGs to route inbound and outbound network traffic of respective sets of logically isolated virtual networks (IVNs) are described. Each IVN may, for example, comprise some set of resources of a virtual computing service (VCS) of the provider network, designated for the exclusive use of a given customer or client of the VCS, as discussed in further detail below. The customer on whose behalf an IVN is set up may wish to establish secure connectivity between the IVN and, for example, a customer-owned data center outside the provider network. A number of mechanisms for providing such connectivity using ERGs may be supported in various embodiments, such as the use of VPNs (virtual private networks) or dedicated physical links between customer networks and the provider network. A given ERG may include several different types of resources, including for example edge routers (ERs) of the provider network, network marker translation agents (NMTAs), and/or service-specific routers (e.g., routers of the VCS at which the IVNs are established, used for managing traffic between the VCS and other services or entities of the provider network).

In at least some embodiments, routing metadata stored at a given ER (such as virtual routing and forwarding (VRF) entries corresponding to a given set of IVNs whose traffic is to be managed by that edge router) may typically be replicated at other edge routers designated for the same set of IVNs. Depending on the specific vendor or make of the ER, any given ER may only be able to store up to some maximum number of metadata entries (e.g., due to memory constraints, processing constraints, or logical constraints imposed by the hardware or software being used for the ER). By partitioning the networking resources into groups, with each group assigned to a respective subset of IVNs rather than to all the IVNs of the provider network, the amount of routing metadata that has to be replicated at each edge router may be reduced in various embodiments. As a result of the partitioning, it may become possible to assign routing resources to IVNs more intelligently: e.g., by designating some subset of ERGs for a few customers with very high volumes of per-IVN traffic, and other subsets of ERGs for a larger number of customers with lower volumes of per-IVN traffic.

In various embodiments, the establishment of ERGs may also enable more balanced utilization of networking resources as customer traffic workloads change. For example, a given IVN that was initially expected to generate N gigabits/second of traffic directed to/from a given customer network may eventually generate close to 2N or even 10N gigabits/second. As a result, the ERG that was initially selected for the IVN's traffic may no longer be the most appropriate. In some embodiments a graceful migration protocol may be used to transfer the responsibilities for the IVN's traffic transparently to a different ERG, e.g., without requiring any pauses or interruptions in the traffic flow, thereby avoiding disruptions to the customer's applications. In at least some embodiments, customers of the provider network may not even be aware of the existence of ERGs, since such configuration issues may typically be handled by administrative or control-plane components and not exposed to clients. Details regarding the establishment and assignment of ERGs, the roles played by the various components of ERGs, and the steps that may be involved in graceful migration of IVN traffic are provided below for various embodiments.

Networks set up by an entity such as a company or a public sector organization to provide one or more network-accessible services (such as various types of cloud-based computing or storage services) accessible via the Internet and/or other networks to a distributed set of clients may be termed provider networks herein. Provider networks may sometimes be referred to as "public cloud" environments. In many cases virtualization technologies may be used to implement components of various provider network services. For example, a single physical computing device may be used to instantiate multiple virtual machines of a computing service. The virtual machines used for client applications may be referred to as "guest virtual machines (GVMs)", "compute instances", or simply "instances" herein, with the physical computing device being referred to as an "instance host" or a "virtualization host". The GVMs may serve as execution platforms for a variety of applications selected by the clients to whom the GVMs are allocated. A virtualization host may be utilized in either a single-tenant mode or a multi-tenant mode in different embodiments. In single-tenant mode, for example, a GVM may be launched at the virtualization host on behalf of only a single customer, and as a result the resources of the virtualization host (e.g., processors, memory, storage and the like) may not be shared with other customers. In a multi-tenant environment, GVMs may be launched on behalf of several customers at the same virtualization host, without the customers necessarily being informed that the same host that is being used for their workload is also being used for other customers. Such transparent resource sharing may in general enable more effective use of the hardware resources of the provider network (e.g., typically, a higher average utilization level may be achieved in multi-tenant mode than in single-tenant mode).

In at least some embodiments, a provider network may enable customers to request the establishment of "isolated virtual networks" (IVNs) at the provider's data centers. An IVN (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables etc. for the IVN. For at least some of the devices within an IVN in some embodiments, the network addresses may not be visible outside the IVN, at least by default. In order to enable connectivity between a customer's IVN and the customer's external network (e.g., devices at the customer's data center or office premises), a virtual private gateway (VPG) may be set up in some embodiments. A VPG may represent a logical entity that is programmatically "attached" to the IVN, e.g., at the request of the IVN's owner. The virtual private gateway may serve as a network concentrator on the provider network side of the path between a customer's data center and the customer's IVN within the provider network. The attachment of a VPG to an IVN may result in the generation and dissemination of various types of networking metadata to the components of a selected ERG in various embodiments, as described below in further detail. In some embodiments one or more VPN (virtual private network) connections may be configured between a customer's IVN and external networks (such as the customer's office network or the customer's data centers) using VPGs. A variety of different protocols may be used for connections between the customer IVNs and the external networks in different implementations—e.g., IPSec (Internet Protocol Security), SSL/TLS (Secure Sockets Layer/Transport Layer Security), DTLS (Datagram Transport Layer Security) and the like. In other embodiments, the provider network may allow customers to use direct dedicated physical links (e.g., physical links between customer-owned routers and provider-network-owned routers) instead of, or in addition to, VPNs for connectivity between IVNs and customer networks. Such dedicated physical links may be referred to as "direct connect" links herein. The term "client network" may also be used herein to refer to a set of customer-owned or customer-managed devices external to the provider network, to which secure connectivity from within the provider network may be established.

In various embodiments, a number of different layers of networking resources may have to be traversed by a given packet of a VPN connection (or a packet sent via a direct connect link) on its way between a client-owned source device (e.g., a laptop, tablet or desktop computer) at a client network, and a destination within the provider network (such as a GVM of a particular IVN set up for the client). The packet may be transmitted from the client device through some number of client-side intermediary devices such as switches and the like to a customer router configured to handle outbound VPN traffic from the client network. After it exits the client network, the packet may eventually reach an aggregation layer router of the provider network. Aggregation layer routers may be set up to act as conduits for collecting and distributing VPN traffic (and/or direct connect traffic) of a plurality of different clients with respective IVNs in various embodiments. From the aggregation layer router, the packet, which may include a VLAN (virtual local area network) tag or VLAN identifier associated with the VPN or direct connect link, may be sent to an edge router (ER) of the provider network. From the ER, the packet may be transmitted to a network marker translation agent (NMTA) responsible for mapping the VLAN identifier or tag to an IVN identifier. The NMTA may also implement an encapsulation protocol in at least some embodiments, in accordance with which the original packet generated at the source is included as the body of an encapsulation packet whose destination address is the IP address of the virtualization host at which the destination GVM runs. In at least some embodiments, each of the services implemented at a provider network, including the VCS, may have its own set of networking front-end devices, such as service-specific routers, that may be used for inter-service communications or more generally for communications to other entities of the provider network. The encapsulated packet may be sent from the NMTA to a selected VCS front-end router (VR) in some embodiments. The VR may send the encapsulated packet to a virtualization management software stack (VMSS) at the appropriate virtualization host. The VMSS may de-capsulate the packet (i.e., extract the packet originally created at the source) and send it to the destination GVM.

Such a path, taken by a packet on its way from the client device to the destination GVM may be termed an "inbound" path herein with respect to the IVN (since the packet is received at the IVN, not transmitted from the IVN). For a packet whose source is a GVM within an IVN, and whose destination is the client device, in various embodiments an "outbound" path may include some or all of the same types of devices as those discussed above, traversed in the reverse order. The original contents of the outbound packet may be intercepted and encapsulated by the VMSS at the virtualization host, and sent via a selected VR to an NMTA. At the NMTA, the original contents may be extracted from the encapsulation packet, sent to an ER, and sent from the ER to an aggregation router for further transmission to the client network. A number of different network administration or control-plane components may be responsible in various embodiments for configuring the various provider network resources involved in the inbound and outbound paths to enable the traffic to flow as desired. Such administrative components may be referred to herein collectivity as a "connectivity manager". In some embodiments, the connectivity manager itself may comprise a plurality of physical and/or logical components that may be distributed across one or more data centers of the provider network. In some implementations, respective sets of control-plane APIs (application programming interfaces) may be implemented to support configuration operations for different portions of the inbound and outbound paths described above. In such scenarios, different connectivity manager subcomponents may be responsible for handling configuration APIs for respective layers of the networking resources.

According to at least some embodiments, a connectivity manager of a provider network may establish a plurality of edge resource groups (ERGs) for network traffic between the VCS and devices external to the provider network. Each ERG may include, for example, a set of edge routers (ERs), a set of NMTAs, and/or a set of VCS routers in some embodiments. Individual ERs of an ERG may exchange routing metadata entries (such as virtual routing and forwarding (VRF) entries corresponding to virtual private gateways attached to IVNs) with other ERs of the same ERG, and not necessarily with ERs of any other ERG. The exchange of the routing metadata entries may, for example, enable each of the ERs within an ERG to route traffic associated with a given set of IVNs assigned to the ERG. However, since any given ER does not have to replicate routing metadata for IVNs served by other ERGs, the metadata-related resource consumption of each ERG would tend to be lower than if all the ERs had to replicate metadata for all the IVNs. A number of different approaches may be taken with respect to determining exactly how many (and which specific) routers, NMTAs and VRs are to be included in different ERGs, as discussed below in the context of FIG. 3 and FIG. 4. For example, in one embodiment, some ERGs may be set up for a class of customers whose IVNs are expected to generate high traffic rates, while other ERGs may be set up for customers with low expected bandwidth needs.

In response to receiving a request to establish connectivity between a particular IVN and a client network, the connectivity manager may select a particular ERG for that VPG/IVN combination in some embodiments. In one embodiment, the request to establish connectivity may comprise a request to configure or attach a virtual private gateway with the IVN. In such an embodiment, from the perspective of a client of the VCS, establishing secure connectivity between the client's network and the IVN may include one or more programmatic interactions (e.g., via a web-based console, a command line tool or an invocation of an application programming interface (API)), one of which includes submitting a request to attach a VPG to the IVN. In some embodiments, the request to attach the VPG may be generated as part of the configuration required for a VPN connection or a direct connect connection. The selection of the ERG may be based on any of a variety of factors in various embodiments, such as the measured workload levels of different ERGs, the traffic expected to be generated from/to the IVN, client resource affinity policies, security policies, availability policies, and so on. With respect to client resource affinity, for example, when an ERG is being selected for a particular IVN of a client, an analysis of the existing networking configuration for other resources assigned to the client (such as other IVNs, guest virtual machines of the client that are not included in IVNs, storage resources allocated to the client, and so on) may be performed, and the ERG for the particular may be selected so as to maintain similar availability/performance/pricing characteristics to those of the other resources. In some embodiments, a client may indicate specific security or tenancy preferences with respect to the networking intermediary devices to be used for their traffic, such as a preference that only one client's traffic should be handled by the intermediary devices. In such a scenario (assuming that an appropriate set of intermediary devices for a new single-tenant ERG can be provisioned, and that the client is willing to agree with pricing terms associated with the single-tenant ERG), an ERG designated solely for that client may be established. Availability and failure resilience policies, e.g., policies that are designed to provide different clients with respective levels of network uptime, may be used in some embodiments for ERG selection. For example, depending on the availability requirements of a given client, an ERG that spans three availability containers of the provider may be selected for the client instead of an ERG that spans two availability containers or a single availability container. (Availability containers are discussed in further detail below with reference to FIG. 5). Migration of IVN traffic from one IVN to another may also be triggered in some embodiments based on some combination of such factors—that is, a migration destination ERG may be selected based on changing client traffic levels, ERG-level load balancing goals, client resource affinity policies, security preferences, and/or availability preferences. The connectivity manager may initiate (e.g., using various internal APIs) the generation and/or propagation of the required metadata entries to resources associated with the selected ERG to enable the desired connectivity. Such metadata entries may include, for example, VRF entries at the edge routers, translation mappings (e.g., VLAN identifier to IVN identifier mappings) for the NMTAs, and NMTA addresses or NMTA routing entries for the VRs and/or virtualization hosts of the IVN. After the metadata has been successfully propagated, traffic may begin to flow in both inbound and outbound directions between the client network and the IVN. In some embodiments in which transparent migration of IVN traffic from one ERG to another is supported, a given ERG may be assigned one of a set of roles with respect to a given IVN, such as a primary role or a secondary role. Additional details regarding the manner in which such roles may be assigned (e.g., using routing protocol-specific local preference settings) and used during migration are provided below.

Example System Environment

FIG. 1 illustrates an example system in which some of the provider network resources used for connectivity to and from isolated virtual networks (IVNs) may be organized into independent edge resource groups (ERGs), such that routing metadata need not be shared across ERG boundaries, according to at least some embodiments. As shown, system 100 includes a provider network 102 at which one or more network-accessible services including a VCS 130 are implemented. A given client of the VCS 130 may be allocated some number of guest virtual machines (GVMs) 129, such as GVM 129A, 129B, 129P or 129Q to execute desired sets of applications. One or more of the GVMs 129 may be executed at a given virtualization host 128 of the VCS, such as virtualization host 128A (at which GVMs 129A and 129B run) and virtualization host 128B (at which GVMs 129P and 129Q run).

In the depicted embodiment, the VCS may enable the logical isolation of one client's resources from the resources allocated to other clients by configuring respective IVNs (isolated virtual networks) such as IVN 125A and IVN 125B. IVN 125A may have been established at the request of a client C1, while IVN 125B may have been effected at the request of a different client C2. In some embodiments, respective sets of virtualization hosts 128 may be designated for respective IVNs, while in other embodiments, a given virtualization host may be used for the GVMs of more than one IVN. To simplify the presentation, the GVMs 129A and 129B shown at virtualization host 129A are assumed to be allocated to client C1, while GVMs 129P and 129Q of virtualization host 129B are assumed to be allocated to client C2.

The provider network may include one or more connectivity managers 180 in some embodiments, comprising a set of administrative or control-plane components that are responsible for a variety of functions such as establishing connectivity between client networks 120 and GVMs 129, monitoring traffic flow, detecting and responding to failures of various network devices, and so on. In the depicted embodiment, a connectivity manager 180 may be responsible for partitioning various categories of networking resources of provider network 102 into a plurality of ERGs (edge resource groups) to achieve various policy objectives of the provider network operator, such as an objective to support clients with widely differing (and potentially growing) bandwidth needs in an equitable and cost-effective manner, an objective to balance workloads among networking devices of the provider network, and so on. Two ERGs are shown by way of example in FIG. 1: ERG 175A (which may be used to provide connectivity between client network 120A of client C1 and IVN 125A as described below) and ERG 175B (which may be utilized to provide connectivity between client network 120B of client C2 and IVN 125B). Generally speaking, the connectivity manager 180 may partition provider network resources into any desired number of ERGs in various embodiments. In at least some embodiments, a given ERG may include some number of edge routers (ERs), some number of network marker translation agents (NMTAs) and some number of service-specific routers (such as VCS routers or VRs). In other embodiments, not all the ERGs may comprise resources of all three types (i.e., ERs, NMTAs and VRs). ERG 175A, for example, includes ER 149A, NMTA 151A and 151B, and VR 153A. ERG 175B includes ER 149B, NMTA 151KL and 151L, and VR 153B in the depicted embodiment. In at least one embodiment, the connectivity manager 180 may expose one or more APIs (application programming interfaces) that may enable administrators of the provider network to request the establishment of new ERGs, and/or to transfer resources from one ERG to another. In some embodiments, a connectivity manager 180 may establish new ERGs automatically as needed, e.g., based on ongoing measurements of traffic associated with existing ERGs. In the latter scenario, administrator-initiated requests for configuring new ERGs may not be required.

In general, the edge router layer 111 may comprise any number of ERs in different embodiments, some subset or all of which may be assigned to different ERGs 175. A given ERG may include a plurality of ERs in some embodiments for a number of reasons, e.g., to support a desired total bandwidth that exceeds the capability of any individual ER, to provide connectivity for a desired number of IVNs, to provide desired levels of availability, and so on. In some embodiments, one or more proprietary networking hardware vendors and/or router models may be selected by the provider network operator for the ERs and/or the VRs. In other embodiments, commodity or general-purpose computing devices may be provisioned as routers. In some embodiments, each NMTA of network marker translation layer 112 may be implemented using one or more commodity servers at which translation software has been installed. In some implementations, depending on the type of server selected, a given NMTA may be able to handle much less traffic than an ER, and as a result a 1:M relationship may exist between an ER and its associated NMTAs. In one implementation, the number of VRs 153 included in a given ERG may match the number of ERs of the ERG; in other embodiments, the number of VRs may differ from the number of ERs.

In at least one embodiment, in order to enable network packets to flow between a client device (such as 145A or 145B, each of which may comprise for example a client-owned server, desktop computer, laptop, or tablet) and a GVM 129 configured within an IVN 125, a logical entity called a virtual private gateway (VPG) 155 may be created and programmatically attached to the IVN. In some embodiments, the connectivity manager 180 may provide one or more programmatic interfaces (such as a web-based console, a set of APIs, a graphical user interface or a command-line tool) to enable clients and/or VCS administrators to request the creation and/or association/attachment of VPGs. In response to a request to configure VPG 155A with IVN 125A, in the depicted embodiment the connectivity manager 180 may select ERG 175A as the ERG to be used (based, for example, on various factors such as the expected traffic needs of IVN 125A, the measured levels of utilization at the resources of ERG 175A relative to other ERGs, and so on). Similarly, in response to a request to configure VPG 155B with IVN 125B, the connectivity manager may assign ERG 175B for VPG 155B based on any of various factors.

After an ERG has been selected, a number of metadata entries may have to be created at and/or propagated to the various components of the ERG. For example, one or more VRF (virtual routing and forwarding) entries representing the IVN may be stored at the ERs of the selected ERG (as well as at routers of the customer traffic aggregation layer 110), and one or more network marker translation mappings (e.g., including translations between VLAN tags and IVN identifiers) may be propagated to the NMTAs of the selected ERG. Routing table entries representing the NMTAs of the selected ERG may be transmitted in some embodiments to the virtualization hosts of the IVN 125.

After the metadata entries indicative of the association between the IVN/VPG combination and the selected ERG have been received at the different layers of networking infrastructure, traffic may begin to flow in both the inbound direction (e.g., from a client device 145 to a GVM 129) and the outbound direction (e.g., from a GVM 129 to a client device 145). As shown, an example of a pathway 166A taken by packets originating at the client device 145A and directed to GVM 129B via ERG 175A may include an aggregation layer router (AR) 147, ER 149A, NMTA 151A, and VR 153A. Similarly, for traffic between client device 145B and GVM 129P of IVN 125B via ERG 175B, pathway 166B may include AR 147, ER 149B, NMTA 151K, and VR 153B in the depicted embodiment.

In some embodiments, based on various triggering conditions, the traffic of a given IVN/VPG may be transferred or migrated from one ERG to another, as discussed below in further detail with respect to FIG. 8a-8e. In at least one embodiment, variations on the basic grouping architecture illustrated in FIG. 1 may be used. For example, instead of transmitting all the traffic associated with a given IVN/VPG using just one ERG, the traffic in at least one direction (inbound or outbound) may be distributed at least temporarily among a plurality of ERGs. In one embodiment, one or more VRs or one or more NMTAs may be shared among a plurality of ERGs. In much of the following description, to simplify the presentation, one VPG is configured per IVN, and the traffic associated with the VPG is assumed to flow between the IVN and one client network. In various embodiments, more than one VPG may be established per IVN— e.g. one VPG may be used for a particular VPN connection to a first client network, another VPG may be used for a second VPN connection, and a third VPG may be used for a direct connect link. In other embodiments, virtual private gateways may not necessarily be set up; instead, for example, the appropriate routing-related information to achieve the desired connectivity may be propagated to the various networking path components without being associated with entities called VPGs.

Scalability and Availability of Individual Edge Routers

Figure 2A:
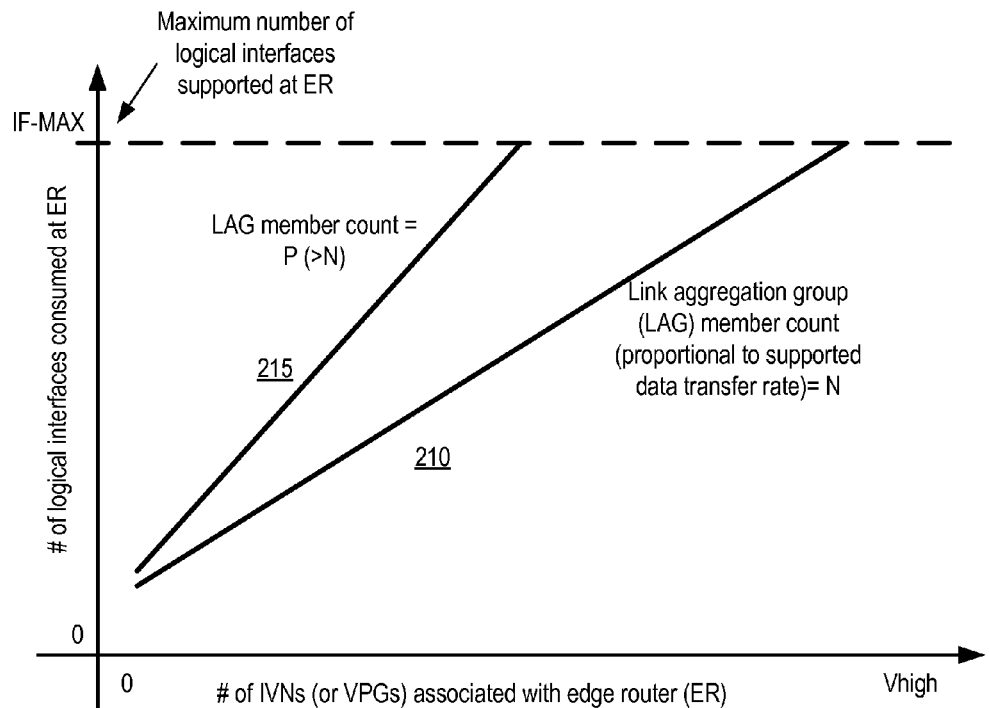
FIG. 2a is a graph illustrating an example of resource constraints that may limit the number of IVNs whose traffic can be routed via a given edge router, according to at least some embodiments.
Figure 2B:
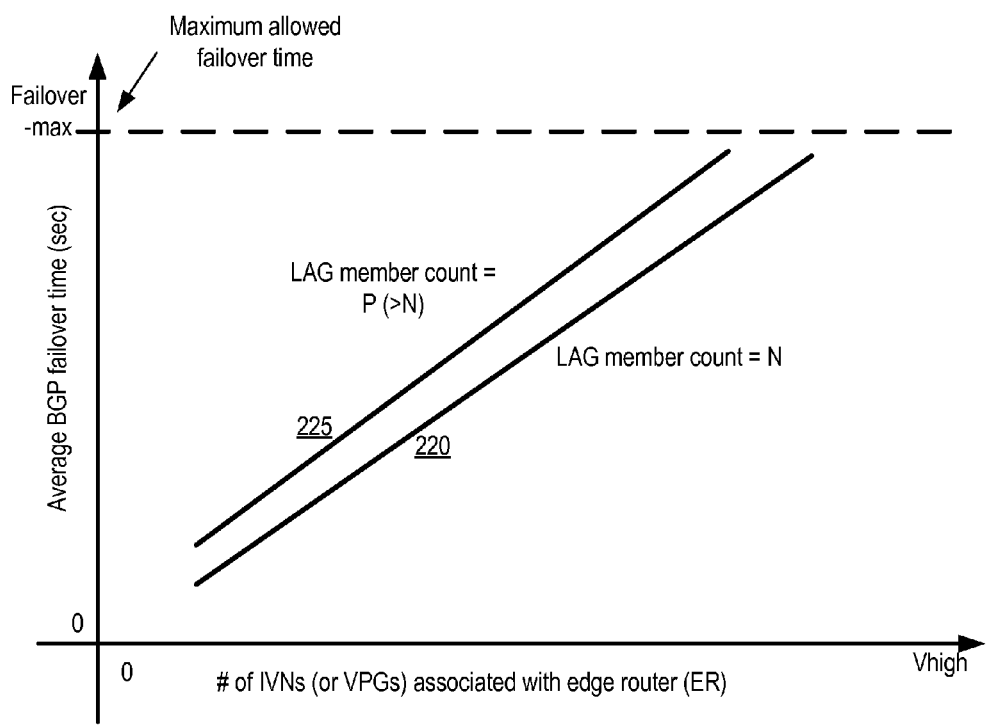
FIG. 2b is a graph illustrating an example of a relationship between router failover time and the number of IVNs whose traffic is routed via a given edge router, according to at least some embodiments.

The establishment of independent ERGs as discussed above, in which only the routing metadata associated with a subset of the IVNs of a VCS is replicated or propagated among the edge routers of any given ERG, may be motivated by a number of limitations of router hardware and/or software. FIG. 2a is a graph illustrating an example of resource constraints that may limit the number of IVNs whose traffic can be routed via a given edge router, according to at least some embodiments. FIG. 2b is a graph illustrating an example of a relationship between router failover time and the number of IVNs whose traffic is routed via a given edge router, according to at least some embodiments. Both the graphs are intended to show qualitative trends which can be used to make ERG configuration choices, and do not necessarily represent actual measurements.

On the X-axis of FIG. 2a, the number of IVNs (or VPGs, assuming one VPG per IVN) for which routing metadata is to be stored/retained at an individual ER increases from left to right. For each of the IVN/VPG combinations, one or more logical interface structures from a pool of available logical interfaces of the ER may be consumed in the depicted embodiment. The number of logical interfaces used may be at least approximately proportional in some implementations to the amount of memory (e.g., main memory) consumed at the router. In at least some implementations, no more than a specified maximum number of logical interfaces (represented by IF-max and the dashed line at the top of FIG. 2a) may therefore be stored. The number of logical interfaces used for a given IVN/VPG combination may also vary with the supported data transfer rate of the ER in the depicted embodiment—e.g., as the number of physical links or members of the link aggregation group (LAG) increases, the rate at which logical interfaces are used may increase as well. Since the consumption of logical interfaces may depend on both the number of IVNs to be supported and the LAG member count, two different curves are shown in FIG. 2a for respective LAG member counts N and P (where P is greater than N). For the larger LAG member count (P), the limit of IF-max logical interfaces may be reached at a lower number of IVNs than for the smaller LAG member count M in the depicted example. The trends shown in FIG. 2a indicate that, when determining how to partition the ERs of the provider network into ERGs, both control-plane considerations (e.g., the number of distinct IVNs whose traffic is to be supported by a given ER) and data-plane considerations (e.g., the data traffic rate) may have to be taken into account in at least some embodiments.

Large distributed environments built primarily using industry-standard commodity components are typically expected to withstand failures of individual components gracefully—for example, a hardware failure at an edge router should ideally not result in significant downtime for client applications. In order to provide high availability for the pathway between client networks and IVNs, the failover time for individual edge routers may need to be kept within reasonable bounds. In FIG. 2a, the amount of time that may be taken for failover of an ER is shown on the Y axis, as a function of the number of IVN/VPGs for which the ER is configured (on the X axis) and the number of LAG members (failover time trends corresponding to LAG member count differences are represented by the two different curves). As shown, the failover times may generally increase with the number of IVN/VPGs in the depicted example scenario. In some cases the failover times may also depend on the number of LAG members as well, although the relationship between failover times and LAG member count may not be as strong as the relationship between failover times and IVNs. As suggested by FIG. 2b, when determining the membership of different ERGs, availability considerations such as the failover time may also have to be taken into account in at least some embodiments. For example, the provider network operator may wish to ensure that as the number of IVNs established in the VCS increases, the subset of IVNs assigned to a given ER remains below a threshold level corresponding to desired maximum failover times.

Alternative Approaches Towards Partitioning Resources into ERGs

Figure 3:
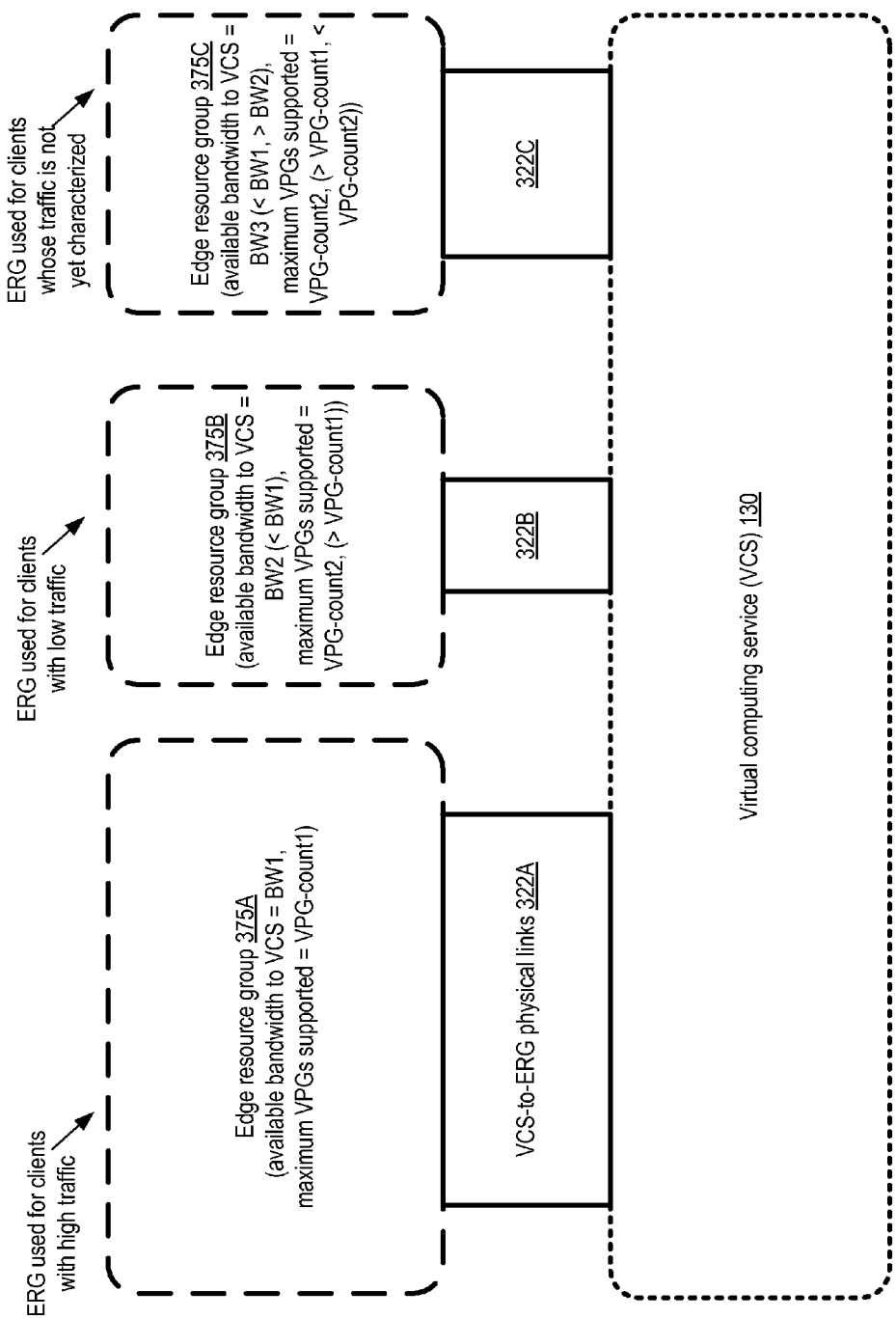
FIG. 3 illustrates a first approach towards partitioning routing-related resources into ERGs, in which ERGs may be selected for customers based on categorization of expected customer traffic rates, according to at least some embodiments.

FIG. 3 illustrates a first approach towards partitioning routing-related resources into ERGs, in which ERGs may be selected for customers based on categorization of expected customer traffic rates, according to at least some embodiments. By way of example, three ERGs are configured in the depicted embodiment: ERGs 375A, 375B and 375C. ERG 375A may comprise one or more edge routers whose collective bandwidth capacity (e.g., based on the total number of members of the LAGs of all the edge routers of the group) with respect to traffic to the VCS 130 is BW1 Gigabit/second. ERG 375B has a bandwidth capacity of BW2, where BW2 is less than BW1. Finally, ERG 375C has a bandwidth capacity of BW3, which is greater than BW2 but less than BW1. The relative bandwidth capacity of the three ERGs is also indicated by the widths of the elements representing the VCS-to-ERG physical links 322 (e.g., 322A, 322B and 322C) shown in FIG. 2, with links 322A representing the highest capacity of the three and 322B representing the lowest of the three. The number of components of one or more type (ERs, NMTAs and/or VRs) included in one ERG (e.g., 375A) may differ from the corresponding number of components included in the other ERGs, e.g., so as to achieve the desired differences in bandwidth capacity.

In the depicted example scenario, ERG 375A, with the highest aggregate bandwidth capacity to/from the VCS 130 among the three ERGs configured, may be designated or selected for a relatively small number of customers who are each expected to generate high levels of traffic to their IVNs. The number of VPGs (which may typically correspond to the number of IVNs) served using ERG 375A may be limited to at most VPG-count1, for example. The count of IVNs served using ERG 375A may be restricted in this fashion in some embodiments because, as illustrated in FIG. 2a, the number of logical interfaces used at the edge routers may depend on both the bandwidth capacity and the number of IVNs associated with the routers. Thus, as the bandwidth to be supported by a given ER increases, the maximum number of distinct IVNs whose traffic is routed using the ER may have to be reduced in order to avoid crossing the ER's maximum logical interface limit (or the limit on other router resources such as memory, processing and the like).

The second ERG, 375B, may be designated for IVNs or VPGs whose bandwidth requirements are expected to be lower than the IVNs to which ERG 375A is assigned. In view of the lower per-IVN bandwidth expected, a larger total number of VPGs (VPG-count2) may be assigned to ERG 375B than to ERG 375A without encountering the router limitation of the maximum logical interface count in the example scenario of FIG. 3.

In some embodiments, as few as two ERGs may be required—one ERG similar to ERG 375A for a few high-bandwidth customers, and one ERG similar to ERG 375B for a larger number of low-bandwidth customers. In the embodiment depicted in FIG. 3, however, a third ERG 375C may also be configured, e.g., for initial assignment to customers whose IVN bandwidth expectations are either unclear at the time of the assignment, or known to be intermediate between the low-bandwidth category and the high-bandwidth category. Thus, both the bandwidth capacity of ERG 375C (BW3), and the number of VPGs supported (VPG-count3), may lie somewhere between the corresponding values for ERG 375A and 375B. In some embodiments, a finer-grained characterization of IVN bandwidth requirements may be performed than shown in the example scenario of FIG. 3—for example, IVNs may be classified into four or five different groups, and respective ERGs may be set up for each group.

In at least one embodiment, instead of or in addition to using expected bandwidth as the criterion used for classifying IVNs for assignment of ERGs, other factors may be considered. In some embodiments, for example, different clients may have different requirements with respect to high availability for their IVN-to-client-network connectivity, and availability may be used to characterize the IVNs and establish and select ERGs. In some embodiments, different pricing models may be supported by the provider network for VPN connections versus direct connect connections, and separate ERGs may be set up for VPN traffic than are set up for direct connect traffic. In at least one embodiment, the networking equipment used for different ERGs may not be identical—e.g., some ERGs may use edge routers purchased from one vendor, while other ERGs may use edge routers purchased from another vendor—and the assignment of VPGs to ERGs may be based on vendor-specific properties of the networking equipment.

Figure 4:
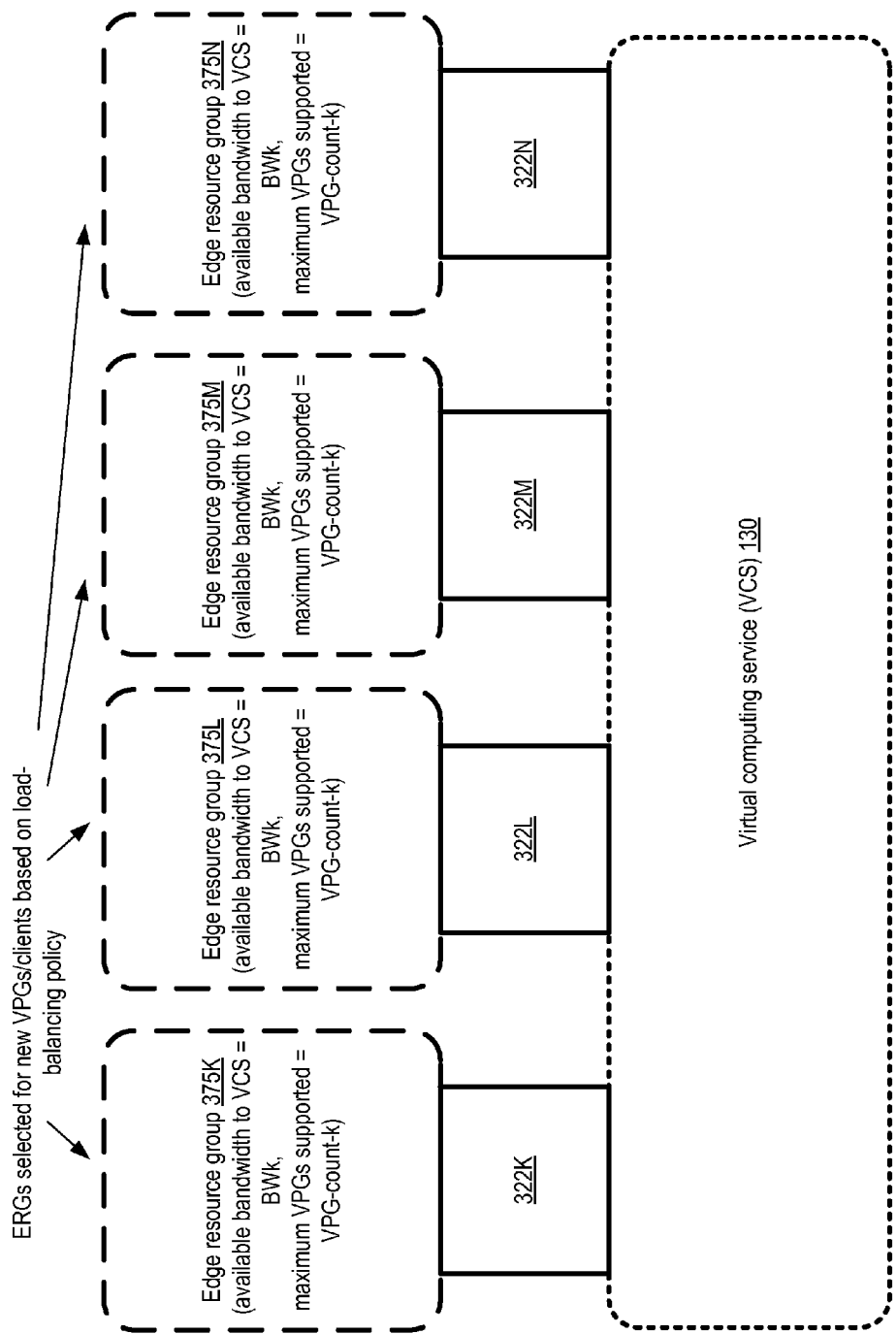
FIG. 4 illustrates a second approach towards partitioning routing-related resources into ERGs based on load balancing goals for the ERGs, according to at least some embodiments.

FIG. 4 illustrates a second approach towards partitioning routing-related resources into ERGs based on load balancing goals for the ERGs, according to at least some embodiments. In FIG. 4, four ERGs 375K, 375L, 375M and 375N are shown, each with approximately equal bandwidth capacities BWk, and each configured to support approximately the same number of VPGs or IVNs (VPG-count-k). In the scenario illustrated in FIG. 4, a particular ERG may be selected for an IVN based on measurements of the workload levels at the different ERGs available. For example, if ERG 375M happens to have had the lowest average utilization (relative to its capacity BWk) during some recent time period (e.g., the most recent 7-day time period), a newly received VPG assignment/attachment request may be fulfilled using ERG 375M. Of course, in various embodiments, a combination of load balancing considerations and expected IVN traffic categorization may be used, combining the concepts illustrated in FIG. 3 and FIG. 4. In one implementation, for example, a set two or three IVNs may be set up for each category of IVN traffic (such as high, medium and low expected traffic), and load balancing may be attempted among the ERGs of each set. In at least some embodiments, as mentioned earlier, other factors or policies may influence the selection of an ERG for a particular IVN, such as client resource affinity policies, client-specific security requirements, and/or client-specific availability preferences.

Highly Available ERGs

In one embodiment, a provider network at which IVNs are implemented may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications may therefore be protected from failures at a single location by launching multiple application instances in respective availability containers, or by distributing the components of a service across multiple availability containers.

Figure 5:
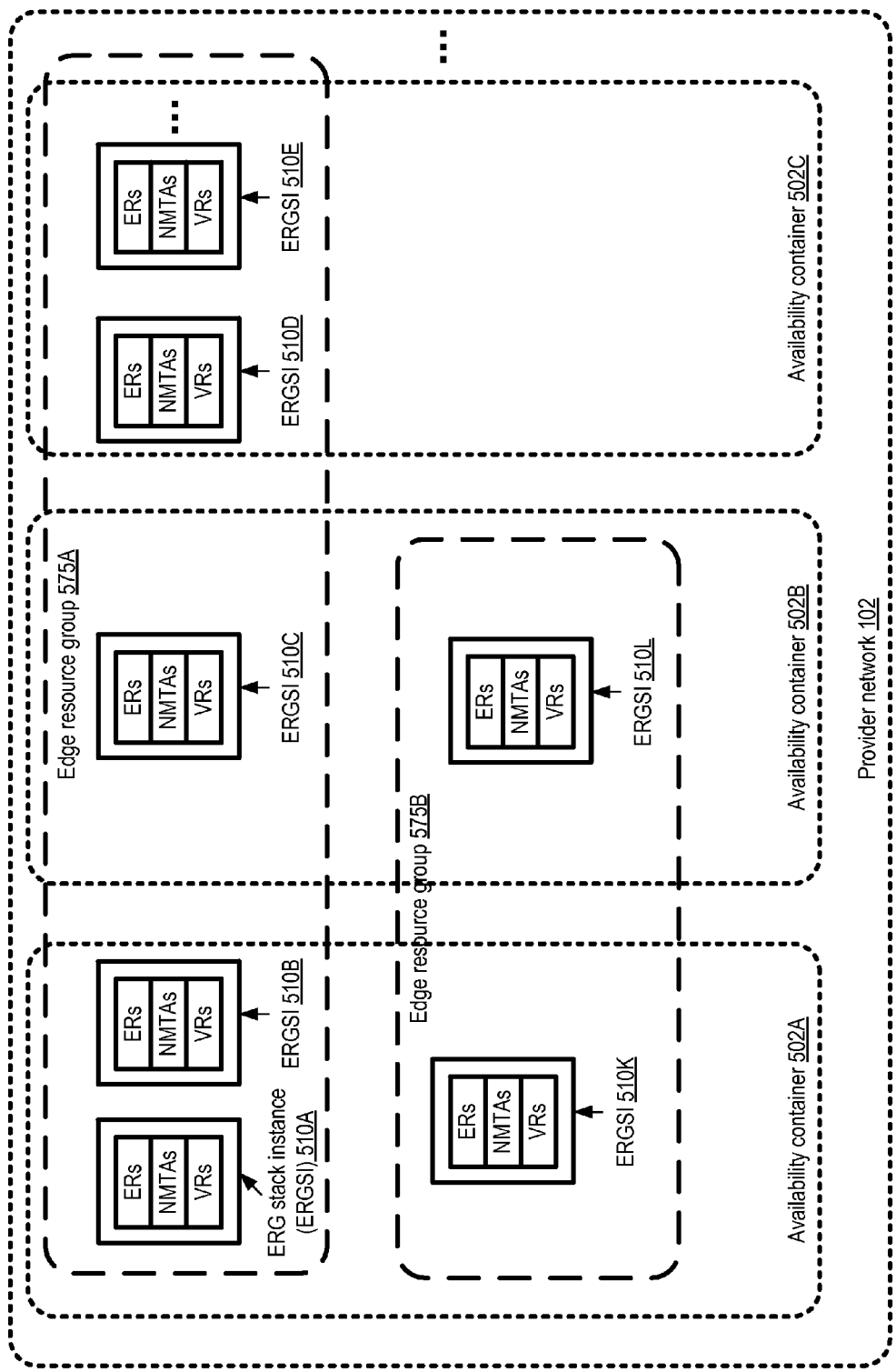
FIG. 5 illustrates examples of the distribution of ERG component stacks among the availability containers of a provider network, according to at least some embodiments.

FIG. 5 illustrates examples of the distribution of ERG component stacks among the availability containers of a provider network, according to at least some embodiments. As shown, provider network 102 comprises at least three availability containers 502A, 502B and 502C in the depicted embodiment. Resources used to provide connectivity between various clients' IVNs and networks external to the provider network may be organized in units called "ERG stack instances" in some embodiments, with each stack instance comprising at least one edge router, at least one NMTA, and at least one VCS router. To implement at least some ERGs, a plurality of ERG instance stacks may be placed in various availability containers 502, e.g., such that at least two availability containers are used for a given ERG. The number of availability containers among which an ERG's stack instances are distributed may be selected based on the desired level of high availability or fault tolerance desired for that ERG. For example, in FIG. 5, ERG 575A comprises stack instances 510A and 510B in availability container 502A, stack instances 510C in availability container 502B, and stack instances 510D and 510E in availability container 502C. In contrast, ERG 575B's resources are distributed across two availability containers, with stack instance 510K in availability container 502A and stack instance 510L in availability container 502B. Thus, ERG 575B may be expected to remain functioning in the event of a large-scale failure at one of the availability containers at which its stack instances are placed, while ERG 575B may even be able to survive concurrent large-scale failures at two different availability containers.

As shown in FIG. 5, different combinations of availability containers may be selected for respective ERGs in at least some embodiments—that is, not all the ERGs may necessarily be distributed across the same set of availability containers. Some clients may express a preference for lower availability (which may correspond in some cases to lower costs) for their networking infrastructure than others. By distributing ERG resources across different combinations of availability containers, a connectivity manager may be able to cater to a variety of client-specific availability needs in some embodiments. The number of stack instances selected within a given availability container 502 for a given ERG may vary in some embodiments, e.g., depending on the number of customers expected for the combination of (ERG, availability container). In some embodiments, the same number of stack instances may be configured for a given ERG in all the availability containers at which the ERG is implemented. In one implementation, the performance capabilities of any one ERG stack instance 510 may be identical to the performance capabilities of any other ERG stack instance. In other implementations, some ERG stack instances may support higher performance levels (e.g., a higher total bandwidth, which may be proportional to the total number of members of the LAGs used and/or the total number of edge routers, NMTAs or VRs used) than others. Various elements of the ERG stack instances may be configured as failover peers—e.g., in one embodiment, if a given edge router ER1 fails, its traffic may be transitioned to a specific edge router ER2 (e.g., of a different stack instance) designated as ER1's failover target.

Example Connectivity Modes: VPNs and Direct Connect Links

Figure 6:
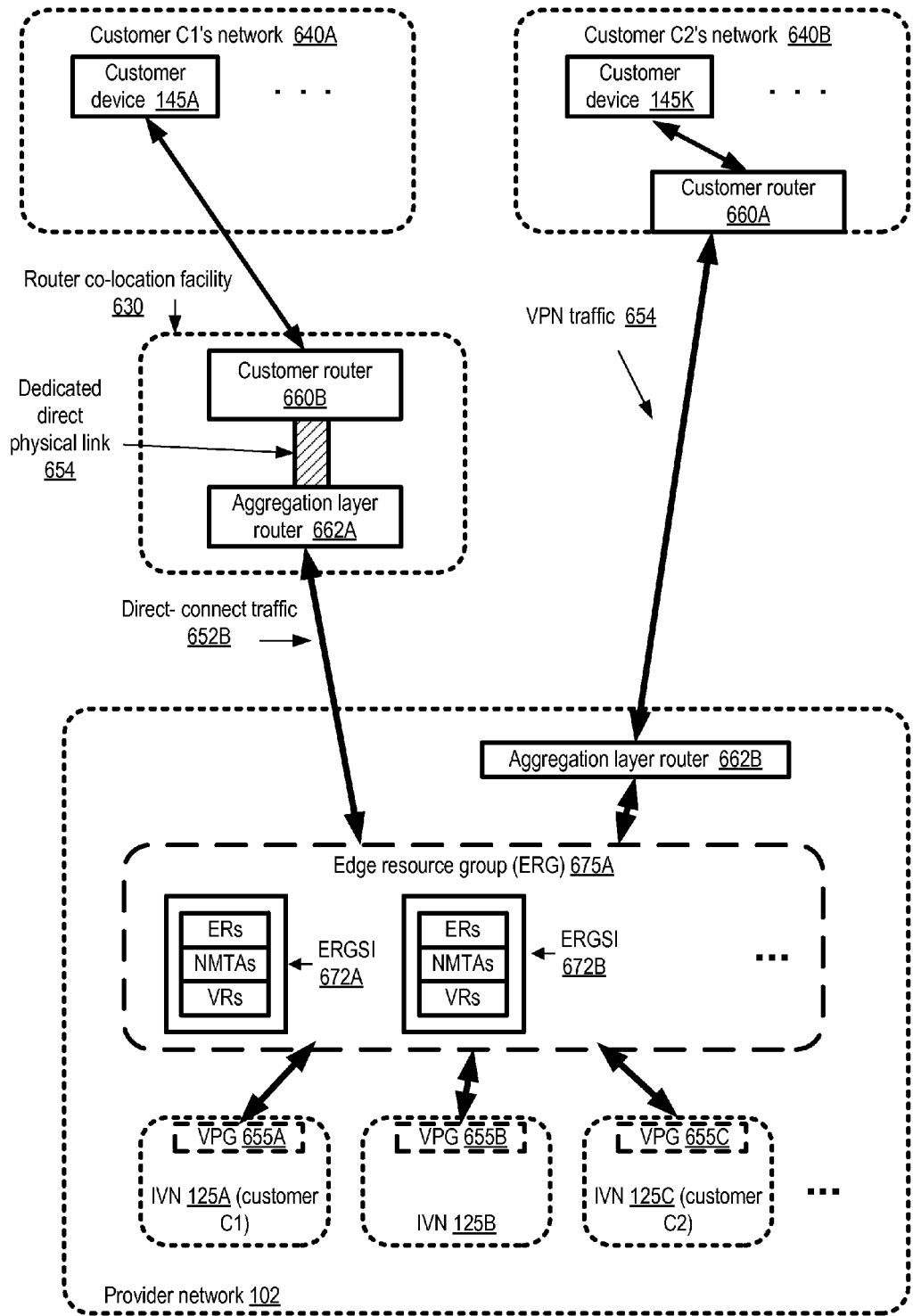
FIG. 6 illustrates an example of a use of an ERG to support VPN traffic as well as traffic transmitted over dedicated direct physical links between customer-owned routers and provider network routers, according to at least some embodiments.

As mentioned earlier, some provider network customers may prefer to use dedicated physical links (also referred to as "direct connect" links) for traffic between their client networks and their IVNs, while other customers may prefer to use VPN connections whose traffic may traverse shared physical links. In some embodiments, a given ERG may be used for both modes of connectivity, while in other embodiments, distinct sets of ERGs may be used for VPNs and direct connect traffic. FIG. 6 illustrates an example of a use of an ERG to support VPN traffic as well as traffic transmitted over dedicated direct physical links between customer-owned routers and provider network routers, according to at least some embodiments.

In the example scenario illustrated in FIG. 6, three IVNs are shown within provider network 102: IVN 125A, 125B and 125C. A customer C1 wishes to establish connectivity between client network 640A and an IVN 125A using direct connect links, and customer C2 wishes to set up a VPN connection between client network 640B and an IVN 125C.

Network isolation (i.e., logical separation of the client traffic of one customer from the traffic of another) may be achieved using either mode of connectivity in the depicted embodiment. However, in at least some implementations, the use of dedicated physical links may provide an added level of security and/or a stronger guarantee of a desired level of performance than may be possible with VPN connections alone. Accordingly, to accommodate the needs of customers such as C1 who wish to employ direct connect links, the operator provider network 102 may set up some set of provider network-owned routers (such as aggregation layer router 662A) at one or more router co-location facilities 630 in the illustrated embodiment. Clients that wish to use direct connect links may set up one or more customer-owned routers such as 660B in a selected router co-location facility 630, and a dedicated physical link 654 may be established between the co-located router pair. In contrast, in the case of VPN traffic, router co-location facilities may not be required; instead, for example, the appropriate configuration settings may be applied to establish connectivity between a customer router 660A (located within the customer network 640B) and an aggregation layer router 662B located within the provider network. As a result, traffic between customer 660A and aggregation layer router 660A may pass through physical links that may be shared by entities other than the provider network and the customer C2 (e.g., one or more links of the public Internet may be used). Respective virtual private gateways (VPGs) 655 (such as VPG 655A for IVN 125A, VPG 655B for IVN 125B, and VPG 655C for IVN 125C) may be set up for the various IVNs regardless of the connectivity mode to be used for the IVNs, e.g. as part of configuration steps initiated by the respective customers on whose behalf the IVNs are established.

Within the provider network 102, ERG 675A comprising one or more ERG stack instances such as 672A and 672B may be set up for handling the traffic between IVNs 125A-125C and external networks in the depicted embodiment. Similar types of routing metadata may be propagated to the edge routers of ERG 675A for the VPN traffic and the direct connect traffic. In addition, similar mappings may be propagated to the NMTAs for both modes of connectivity in the depicted embodiment, and similar NMTA routing information may be propagated to the virtualization hosts and/or the VRs. From the perspective of the ERG design and implementation, both VPN and direct connect traffic may be handled in a similar fashion in at least some embodiments. In some embodiments, other alternative approaches to secure connectivity between IVNs and external networks (i.e., solutions that do not involve the use of VPNs or direct connect links) may also or instead be implemented using ERGs.

Example Packet Transmission Path

Figure 7:
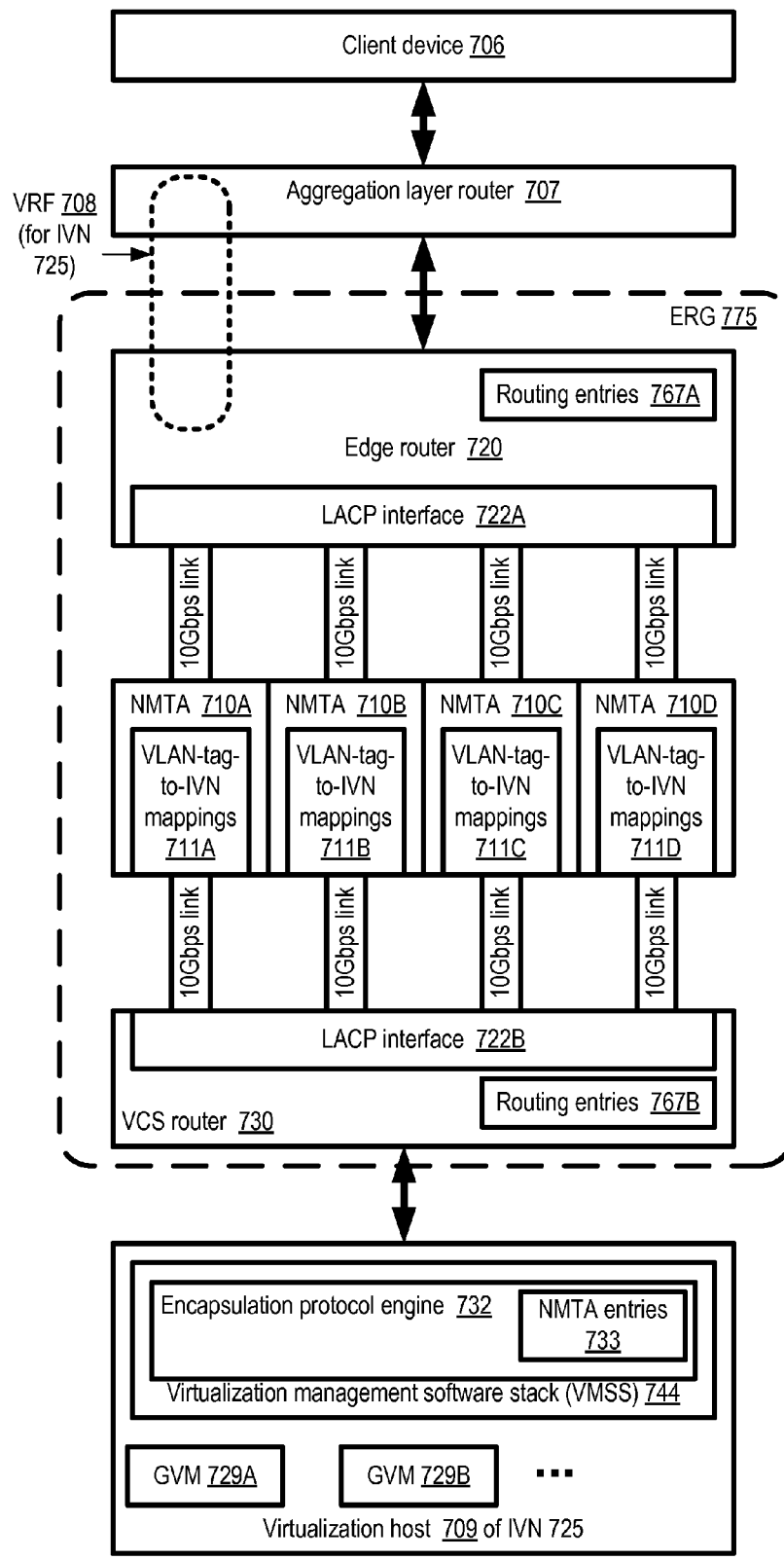
FIG. 7 illustrates example components of a path traversed by network packets transmitted between a client-owned device and a guest virtual machine of an IVN of a provider network, according to at least some embodiments.

FIG. 7 illustrates example components of a path traversed by network packets transmitted between a client-owned device and a guest virtual machine of an IVN of a provider network, according to at least some embodiments. Inbound traffic packets originate at client device 706 and are to be delivered to a guest virtual machine (GVM) such as 729A or 729B in the example scenario shown. Outbound traffic packets originate at a GVM 729 and are to be delivered to client device 706.

As mentioned earlier, inbound packets from external client networks may be collected at aggregation layer routers such as router 707. Virtual routing and forwarding (VRF) entries may be shared between the aggregation layer routers and the edge routers of ERG 775 in the depicted embodiment. For example, a VRF entry 708 may be stored at edge router 720 and aggregation layer router 707 in response to a request by the client to attach a virtual private gateway to IVN 725 in the depicted embodiment. In some embodiments, additional routing table entries 767A may also be stored in edge routers 720 (e.g., for routes that are not necessarily affiliated with VPN traffic to IVNs or direct connect traffic to IVNs). When an inbound packet Ipkt arrives at an edge router 720 from an aggregation layer router 707, an appropriate NMTA 710 (e.g., 710A, 710B, 710C or 710D) may be selected for handling the inbound packet, and the packet may be sent to the selected NMTA via a 10 Gbps link as shown. The selection of the NMTA may, for example, be based on partitioning the address space for various IVNs whose traffic is being handled at ERG 775 in some embodiments—e.g., IVN 725A's traffic may be routed to NMTA 710A, while the traffic for a different IVN (not shown in FIG. 7) may be sent to a different NMTA such as 710C. In other embodiments, the IVN address space may not be partitioned among different NMTAs 710—instead, any of the NMTAs may be used to handle traffic directed to any of the IVNs to which the ERG is assigned. Each NMTA may store a respective set of VLAN-tag-to-IVN mappings 711 (e.g., mappings 711A-711D at NMTAs 710A-710D respectively), so that the NMTA is able to encapsulate inbound packets (whose headers may include VLAN tags indicating their VPN connection or direct connect connection) for transmission towards their destination GVMs 729 as described below.

Each GVM 729 may have been assigned one or more network addresses in the depicted embodiment, such as a private IP address selected by the client who owns the GVM's IVN. Since each IVN owner is granted substantial flexibility with regard to network address assignment for their GVMs, the addresses of two different GVMs in two different IVNs may overlap. Furthermore, in order to reach a given GVM, the inbound packet Ipkt may first have to reach the physical network interface card (NIC) of the virtualization host at which the GVM is instantiated, and the NIC may have its own network address distinct from the addresses of the GVMs running on the virtualization host. As a consequence, an encapsulation/de-capsulation protocol may be implemented in various embodiments, collectively by the NMTAs 710 and the virtualization management software stacks 744 of the virtualization hosts 709. An inbound packet Ipkt received at the NMTAs 710 may be included as the body of an encapsulation packet Encaps_Ipkt directed to the appropriate virtualization host 709, with the NMTA responsible for generating the encapsulation headers (with the appropriate virtualization host address as the destination address) using mappings 711. The encapsulated packet Encaps_Ipkt may next be transmitted to a VR 730, e.g., via a 10 Gbps NMTA-to-VR link in the depicted embodiment. Both the edge router 720 and the VCS router 730 may utilize respective LACP interfaces 722 (e.g., 722A and 722B) for communication with the NMTAs 710 in the depicted embodiment. It is noted that although four NMTAs per edge router are illustrated in FIG. 7, in general any desired number of NMTAs may be configured for a given edge router 720 in various embodiments. In some implementations the number of NMTAs to be configured for a given edge router may be determined by subdividing the maximum bandwidth supported by the edge router (e.g., 40 Gbps) by the bandwidth capacity of an NMTA (e.g., 10 Gbps).

A virtualization management software stack (VMSS) 744 may act as an intermediary between hardware components of a virtualization host 709 (such as a NIC used for receiving and transmitting network packets) and the guest virtual machines 729 instantiated at the host in the depicted embodiment. In some implementations, the VMSS may for example include a hypervisor and/or an administrative instance of an operating system running in a privileged domain of execution (which may be referred to as domain zero or "dom0"). The VMSS 744 may include an encapsulation protocol engine 732 in the depicted embodiment, and may be provided a set of NMTA routing entries 733. When an encapsulated inbound packet Encaps_Ipkt is received at a NIC of the virtualization host (to whose network address it was directed by an NMTA 710), the encapsulation engine 732 may strip the encapsulation headers and extract the original packet Ipkt which was generated at the source client device 706. The extracted packet may then be delivered to the appropriate GVM 729, e.g., based on the destination network address indicated in Ipkt's headers.

When a GVM 729 generates an outbound packet Opkt, it may indicate the network address of the client device 706 as the destination of the packet, and the network address of the GVM as the source. The VMSS 744 may intercept the outbound packet, and the encapsulation protocol engine 732 may generate a corresponding encapsulated version Encaps_Opkt indicating the network address of the virtualization host's NIC as the source, and indicating the IVN identifier of IVN 725 as the source IVN. In some implementations the destination of Encaps_Opkt may be set to a particular NMTA's address, e.g., using the NMTA entries 733. The encapsulation packet Encaps_Opkt may then be transmitted to the particular NMTA 710. The NMTA may extract the original outbound packet Opkt from Encaps_Opkt, add the VLAN tag associated with the IVN 725, and transmit it via the edge router and the aggregation router to the destination client device.

As indicated in FIG. 7, routing-related metadata may be stored at several layers of the resources of the provider network 102 to enable packets to be transmitted between client devices 706 and GVMs 729. Various subcomponents of the connectivity manager (not shown in FIG. 7) may, for example, initiate the generation or propagation of the VRF entries 708, the additional routing entries 767A and 767B, and the NMTA entries 733 in the depicted embodiment. In one implementation, a number of different APIs may be issued by a coordination component of the connectivity manager to layer-specific control-plane components to trigger the generation of the appropriate sets of metadata.

Graceful Migration of IVN Traffic Across ERGs

As discussed above, in at least some embodiments a particular ERG may be selected for routing the inbound and outbound traffic associated with a given IVN in response to a connectivity request (e.g., when a request to attach a virtual private gateway to the IVN). In one embodiment, for example, an estimate of the bandwidth needs of the IVN may be generated, and that estimate may be used to select the ERG from among a set of diverse ERGs such as those illustrated in FIG. 3. In another embodiment, an ERG may be selected for an IVN based on the measured distribution of traffic among the available ERGs, e.g., in order to meet a workload balancing goal, as illustrated in FIG. 4. Regardless of the reasons for selecting the initial ERG for a given IVN, it may sometimes be the case that after some period of use, the initially-selected ERG no longer appears to be the best choice for the IVN. In some embodiments the connectivity manager may collect and analyze various performance and/or availability metrics associated with the different layers of networking resources used for the IVN traffic, and the analysis may reveal that the initial reasons for selecting a particular ERG no longer apply. It may therefore become desirable, under certain triggering conditions, to transfer the responsibility for routing traffic of the IVN from one ERG to another, while disrupting the traffic flow as little as possible. Such a change may be referred to herein as "migrating the traffic" of the IVN, although any given packet would of course be transmitted using just one ERG. In some cases, such traffic migration may also or instead be desired for maintenance-related reasons—e.g., if a new version of hardware or software is to be deployed at a given ERG, it may be advisable to migrate existing IVN workloads of that ERG before the maintenance is begun (and potentially undo the migration after the maintenance window ends). In various embodiments, a traffic migration protocol may therefore be implemented, which may comprise a sequence of reversible atomic and idempotent steps in some embodiments.

FIG. 8a-FIG. 8e collectively illustrate examples phases of a transparent procedure that may be used to migrate traffic of an IVN from one ERG to another, according to at least some embodiments. The procedure may be considered transparent in that clients may typically not be able to discern that any changes in the way their traffic is being handled. In the depicted embodiment, a given ERG may be granted one of at least two roles with respect to an IVN/VPG combination—a primary role, or a secondary role. The roles may be assigned using a variety of techniques in different embodiments, such as by adjusting local preference settings associated with BGP (Border Gateway Protocol) at the aggregation layer routers, by adding metadata fields to the routing entries used at aggregation layer routers, or by adding more specific routing table entries (i.e., routing table entries directed to a smaller range of network addresses). The effect of configuring a given ERG as the primary ERG for an IVN/VPG may be that inbound traffic may be routed through the primary ERG, even though one or more secondary ERGs with additional routes to the IVN may have been set up. For example, in some implementations, the default local-preference value assigned to routes in a BGP implementation may be 100. Using a "set local-preference 400" command supported by BGP, for example, the weight assigned at an aggregation router to the set of routes associated with a primary ERG may be increased. When a particular inbound packet is to be routed, the aggregation layer router may typically use the higher local preference setting (400 versus the default of 100) to select the primary ERG routes instead of the secondary ERG routes. Similar approaches may be used with protocols other than BGP in various embodiments. In some embodiments, more than one ERG may be granted the primary role (e.g., temporarily during one of the migration phases described below), and in such a scenario the inbound traffic may be distributed among the set of ERGs that are configured as primaries.

Figure 8A:
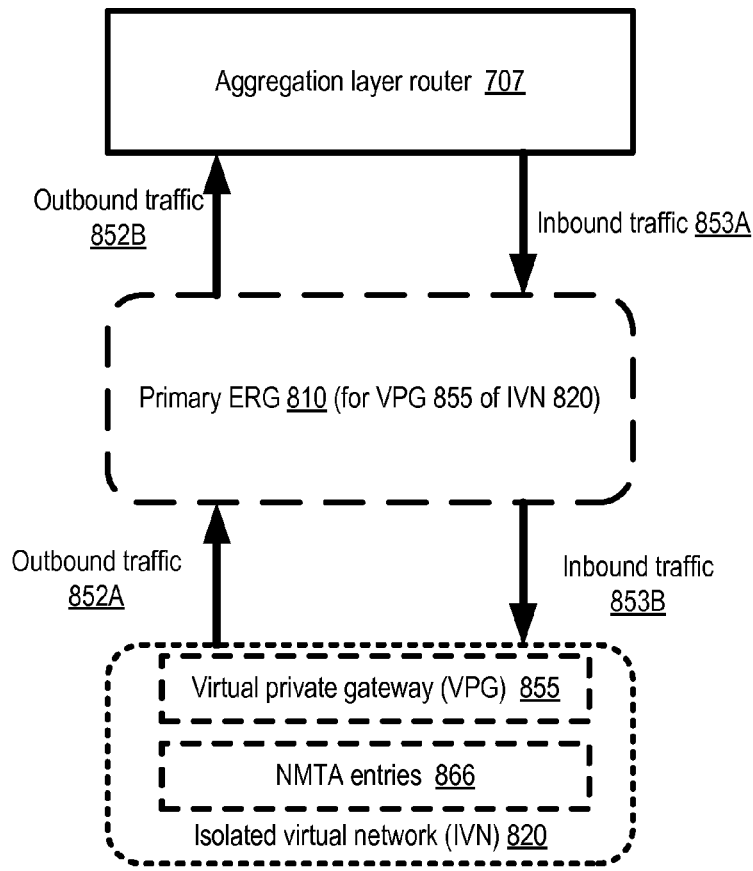
FIG. 8a-FIG. 8e collectively illustrate examples phases of a transparent procedure that may be used to migrate traffic of an IVN from one ERG to another, according to at least some embodiments.

FIG. 8a shows a preliminary phase (phase 0) of a migration protocol which may rely on the use of primary and secondary roles for ERGs. In the initial (pre-migration) state illustrated, ERG 810 is granted primary status for the traffic between IVN 820 and external networks. In the example scenario shown, no secondary ERGs are configured for IVN 820 at this preliminary phase. A virtual private gateway (VPG) 855 has been programmatically attached to IVN 820, and a set of NMTA entries 866 has been distributed among the virtualization hosts whose GVMs are part of the IVN 820. All inbound traffic 853A flows from the aggregation layer router 707 to the ERG 810, and encapsulated packets of the inbound traffic 853B flow from the ERG 810 to the GVMs of the IVN 820. Similarly, all the outbound traffic (including encapsulated versions 852A of the packets as well as un-encapsulated packets 852B) flows from the IVN 820 to the primary ERG 810, and from the primary ERG 810 to the aggregation layer router 707 on its way to the external network destination. Details of the order in which specific components of the ERG stack instances may be traversed in either direction were shown in FIG. 7.

Figure 8B:
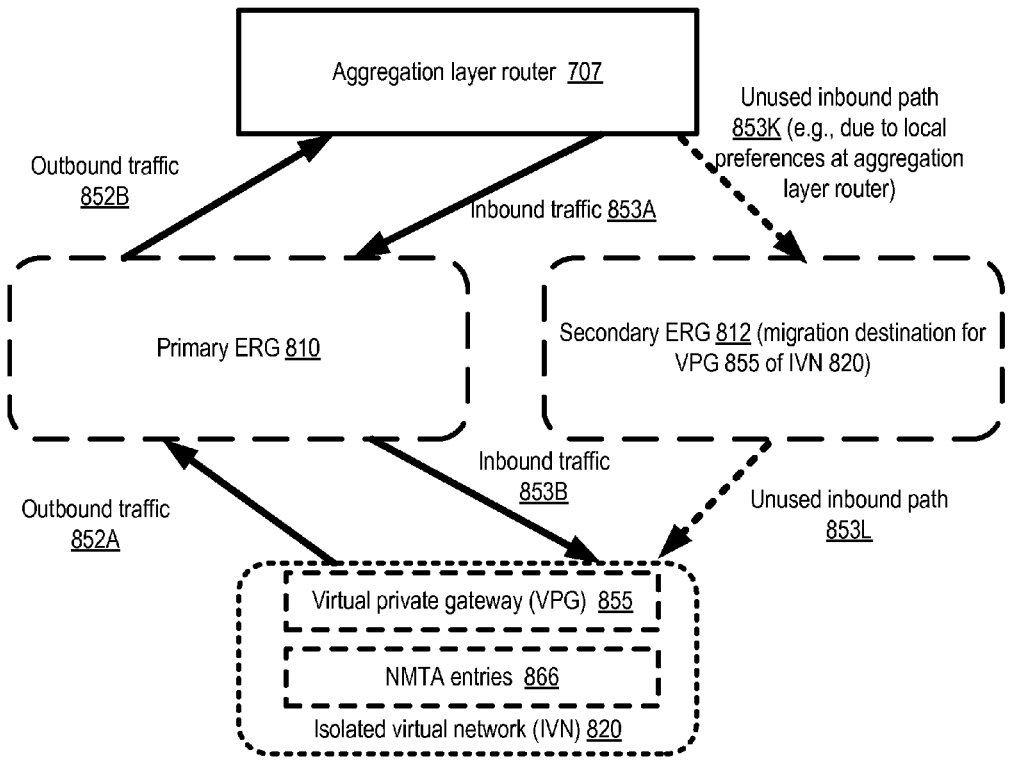

A number of configuration operations may then be initiated in a sequence of phases, first to enable connectivity via a different ERG, and eventually to disable connectivity via ERG 810. In phase 1 of the migration protocol, as shown in FIG. 8b, a migration destination ERG 812 may be configured for IVN 820 and VPG 855 in a secondary role. In some embodiments, an add_secondary_ERG API may be supported by the connectivity coordinator to enable the addition of ERGs in secondary roles to an existing IVN/VPG combination. Such an API may be implemented as an atomic and reversible operation in at least some embodiments, so that the state of the connectivity is not left inconsistent if a failure occurs during the addition of the secondary ERG, and so that a clean and consistent rollback of the operation to add the secondary ERG can be performed if required. In the scenario shown in FIG. 8b, additional inbound paths 853K and 853L are set up, e.g., by propagating routing metadata to the aggregation layer router 707 and/or to NMTAs of secondary ERG 812, but the inbound traffic still flows through the primary ERG 810. That is, inbound paths 853K and 853L may remain unused, even though they have been configured. Outbound traffic also continues to flow through primary ERG 810, as the NMTA entries 866 have not been updated to reflect the addition of ERG 812 as a possible outbound path. The selection of the inbound pathway for a packet may be governed primarily by the primary versus secondary designation of ERGs 810 and 812 in FIG. 8b (e.g., using local preference settings as discussed above), while the selection of the outbound pathway may be governed primarily by the NMTA entries 866.

Figure 8C:
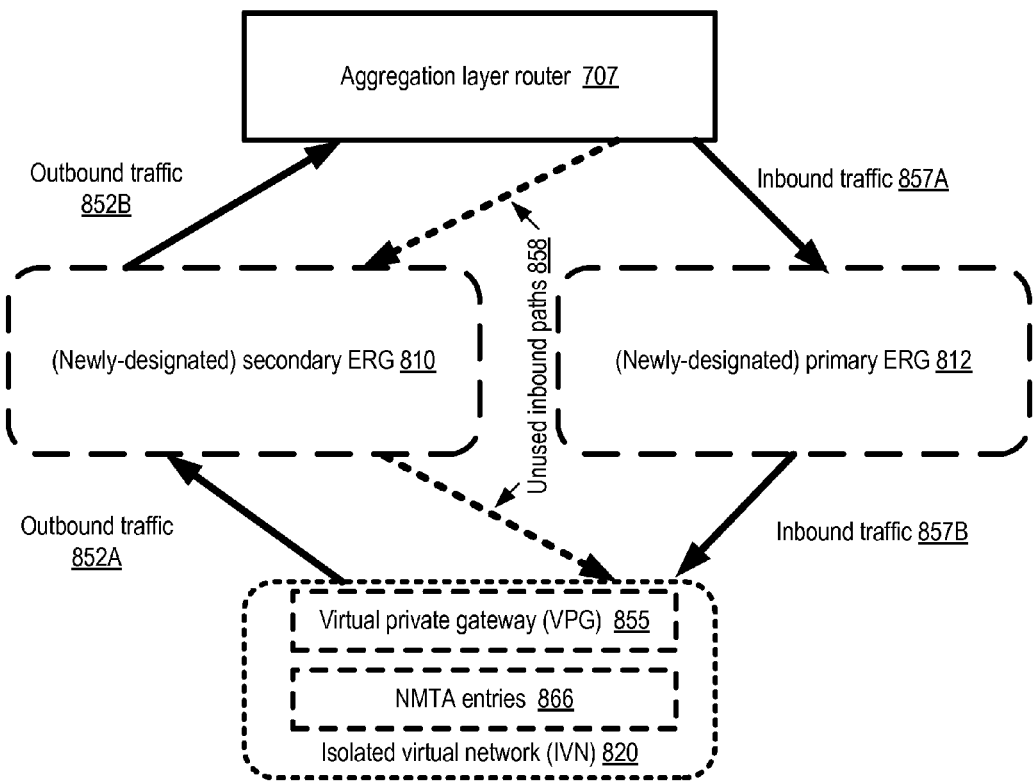

The next phase (phase 2) of the migration protocol is illustrated in FIG. 8c. In phase 2, the roles of the primary and secondary ERG may be switched—that is, the secondary ERG 812 may be promoted to primary status (as indicated by the label "(Newly-designated) primary ERG"), and the primary ERG 810 may be demoted to secondary status (as indicated by the label "(Newly-designated) secondary ERG"). As a result of the change in status, the inbound traffic 857A and 857B may begin to flow via ERG 812, and inbound pathways 858 associated with ERG 810 may no longer be used. In some embodiments, a single API such as switch_ERG_roles may be used to implement the role reversal illustrated in FIG. 8b. In other embodiments, two separate APIs may be implemented—one to make ERG 812 a primary ERG, and then one to demote ERG 8120 to secondary status. In phase 2, the NMTA entries 866 at the IVN have still not been updated to include information about ERG 812's NMTAs. As a consequence, outbound traffic continues to flow via ERG 810 at this stage. The operations to change the roles of the ERGs may also be implemented atomically in various embodiments, and may also be reversed or undone if necessary without leaving the routing information at the various components in an inconsistent state.

Figure 8D:
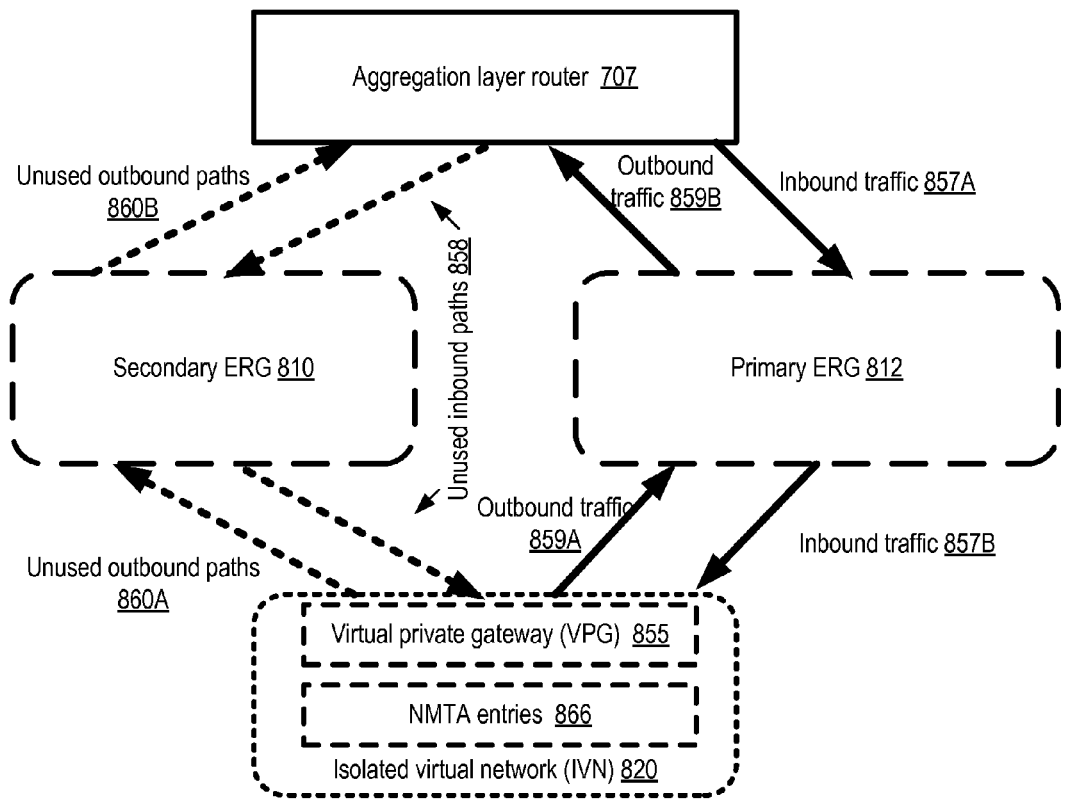

In phase 3 of the migration protocol, illustrated in FIG. 8d, the NMTA entries 866 may be updated to enable outbound traffic to also flow through the migration destination ERG 812, via paths 859A and 859B. The pathways 860A, 860B and 858 associated with ERG 810 may no longer be used. In some implementations, an API such as propagate_NMTA_updates (or replace_VPG_ERG) may be used to disseminate the NMTA entries associated with ERG 812 to the IVN virtualization hosts. In at least one implementation, the NMTA entries corresponding to the ERG 810 may be deleted from (or overwritten at) the virtualization hosts associated with IVN 820. In other implementations, the NMTA entries for ERG 810 may continue to exist at the virtualization hosts, but may be marked as low-priority or secondary to ensure that the NMTAs of ERG 812 are used for outbound traffic.

Figure 8E:
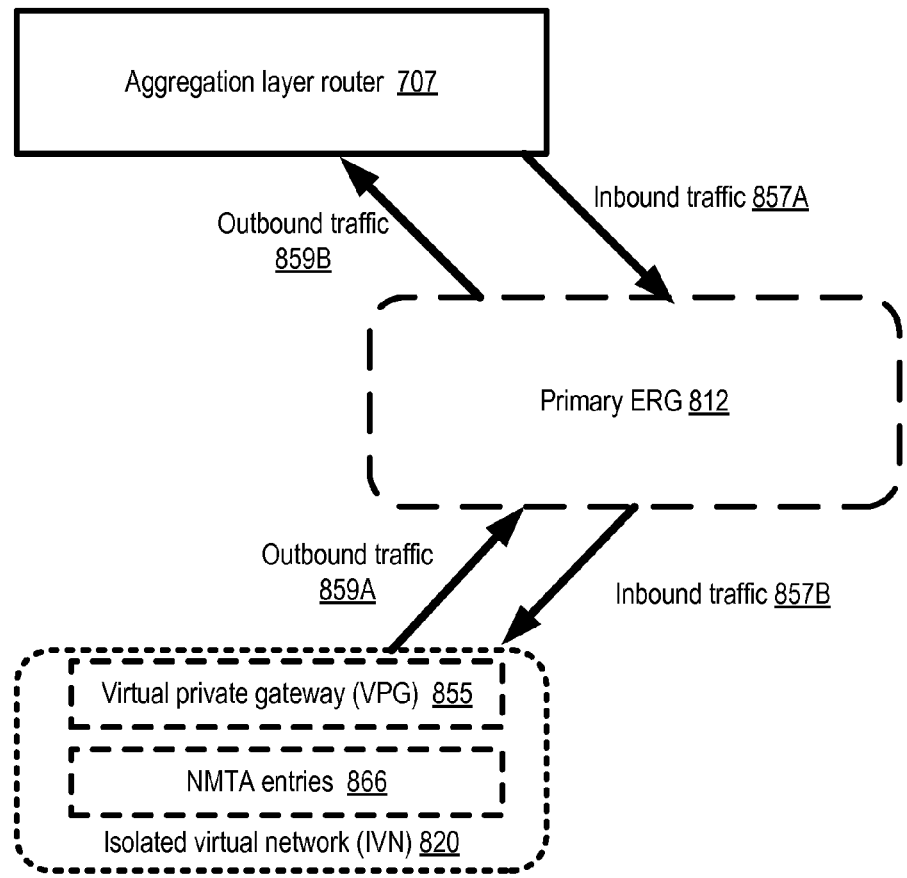

FIG. 8e shows a final phase, phase 4, of the migration protocol. In this phase, metadata indicative of the association between ERG 810 (the source ERG of the migration) and IVN 820 may be deleted, e.g., using an API such as delete_ERG. As a result, only ERG 812 (configured as primary) may continue to be assigned to the traffic associated with IVN 820 and VPG. As with all the other stages of the migration protocol, the operations performed during phase 4 may be implemented in an atomic and reversible manner in various embodiments.

Variations of the protocol illustrated in FIG. 8a-FIG. 8e may be used in some embodiments. For example, instead of migrating inbound first, in some embodiments outbound traffic may be migrated first to the destination ERG. In at least some embodiments, more than one ERG may be used concurrently for a given IVNB/VPG combination for desired time periods, e.g., either for outbound traffic or for inbound traffic. In some embodiments, a state similar to that illustrated in FIG. 8c may be sustained for some desired time period, during which a different ERG is used for inbound traffic than for outbound traffic.

Methods for Supporting ERGs and IVN Traffic Migration

Figure 9:
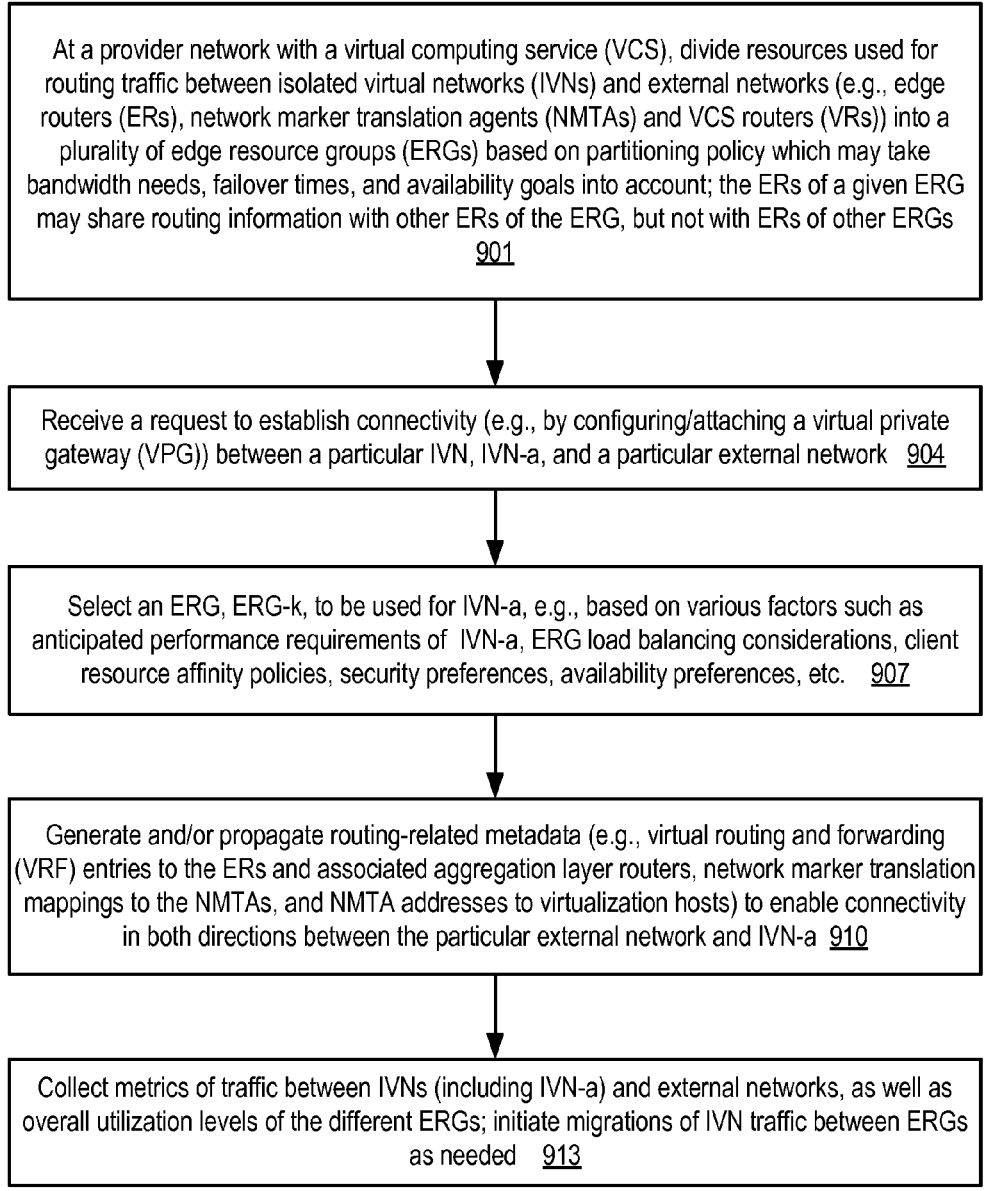
FIG. 9 is a flow diagram illustrating aspects of operations that may be performed to establish edge resource groups (ERGs) and enable connectivity with a client's IVN using a selected ERG, according to at least some embodiments.

FIG. 9 is a flow diagram illustrating aspects of operations that may be performed to establish edge resource groups (ERGs) and enable connectivity with a client's IVN using a selected ERG, according to at least some embodiments. A provider network may implement a virtual computing service (VCS) that includes support for setting up isolated virtual networks (IVNs) using provider network resources on behalf of various clients. An IVN may serve as a virtualized approximation of an isolated network set up on client premises—that is, the client may be able to perform various aspects of network configuration for the various virtualized components such as GVMs of an IVN, such as assigning IP addresses, setting up subnets and the like. At least some clients may wish to establish secure connectivity between client networks located outside the provider network (e.g., at the client's premises) and the GVMs set up within an IVN. A number of intermediary layers of provider network resources and metadata may be involved in setting up such connectivity and routing inbound and outbound packets. As indicated in element 901, a collection of such intermediary resources used for routing IVN traffic may be partitioned into a plurality of edge resource groups (ERGs) in the depicted embodiment. An ERG may include, for example, one or more edge routers, one or more network marker translation agents (NMTAs), and one or more VCS routers in some embodiments. The organization of the resources into ERGs may reduce the amount of routing-related information that may have to be replicated at various components—e.g., in at least some embodiments, routing-related metadata may be shared or replicated only among the devices of one ERG, and may not have to be shared or replicated across ERG boundaries.

Any of a number of different partitioning policies may be used to determine which resources are to be included in which ERG in various embodiments. For example, in one embodiment, IVNs may be categorized based on their expected traffic needs, and different ERGs may be set up for high-bandwidth-needs IVNs than are set up for IVNs that are expected to require lower bandwidth. In other embodiments, the partitioning policies may take failover times of the ERG components into account; the failover times may, for example, be affected by the number of distinct IVNs supported. In some such embodiments, resources may be grouped in such a way that a target failover time for an edge router or an NMTA can be achieved with a high probability. Load balancing considerations may also influence the partitioning of resources into ERGs. In at least some embodiments, an ERG may comprise one or more stack instances at respective availability containers of the provider network, e.g., to ensure that the connectivity between IVNs and external networks may be sustained even in the event of large-scale failures at one or more data centers of the provider network. In at least one embodiment, the control-plane components of the provider network (e.g., one or more connectivity managers associated with the layers of ERG resources) may implement a set of APIs that can be invoked to create new ERGs, or to transfer resources from one ERG to another.

As shown in element 904, the one or more connectivity managers may receive a request to establish connectivity between a specified IVN, IVN-a, and a particular external network. In some embodiments, the connectivity establishment request may comprise a request to attach a virtual private gateway (VPG) to an IVN. In at least one embodiment, a number of different modes of connectivity may be supported, such as connectivity via VPNs or connectivity using dedicated physical links (also known as direct connect links) set up at router co-location facilities between client-owned networking equipment and provider-network-owned networking equipment.

A particular ERG, ERG-k, from among the plurality of ERGs set up for the VCS may be selected in response to the connectivity establishment request (element 907). The selection of ERG-k may be based, for example, on the expected bandwidth needs of the client, on the measured workloads of the different ERGs available (e.g., a relatively lightly-loaded ERG may be selected instead of ERGs that are already heavily utilized), and/or on other factors such as client resource affinity policies, security preferences, or availability preferences.

The appropriate set of routing-related information may then be generated at and/or propagated to the various networking layers involved (element 910). Such information may include VRF (virtual routing and forwarding) entries corresponding to IVN-a or the VPG to be attached to IVN-a, which may be stored at the edge routers of ERG-k and/or at aggregation layer routers which serve as conduits or collectors of client network traffic directed at the VCS. The NMTAs may be provided with mappings that can be used to translate VLAN identifiers or tags to IVN identifiers, and such mappings may be used to encapsulate inbound packets directed to the GVMs of the IVN (and/or to de-capsulate or extract outbound packets directed from the GVMs to the external networks). NMTA addresses of the selected ERG (ERG-k) and/or corresponding routing table entries may be propagated to the set of virtualization hosts at which the GVMs of IVN-a run. In some embodiments, respective APIs implemented by the connectivity manager(s) may be used for each type of metadata entry that is to be created or propagated. Using the metadata distributed to the various layers, inbound packets may be transmitted to the appropriate GVMs, and outbound packets may be transmitted to the appropriate client devices at the external networks. Only the resources of the selected ERG, ERG-k, may have to store the metadata pertaining to IVN-a; other ERGs may not be required to store IVN-a-related metadata in the depicted embodiment.

After bi-directional connectivity has been established between IVN-a and the particular external network, a number of different metrics may be collected with respect to ERG-k (as well as the other ERGs that have been designated for other IVNs) (element 913). For example, the utilization levels of different components of the ERGs may be collected, the fraction of available bandwidth capacity used may be monitored, failover times (if any of the components fail) may be collected, and so on. Trends in the metrics collected over time may be analyzed in some embodiments to determine if and when graceful migrations of IVN traffic from one ERG to another should be initiated.

Figure 10:
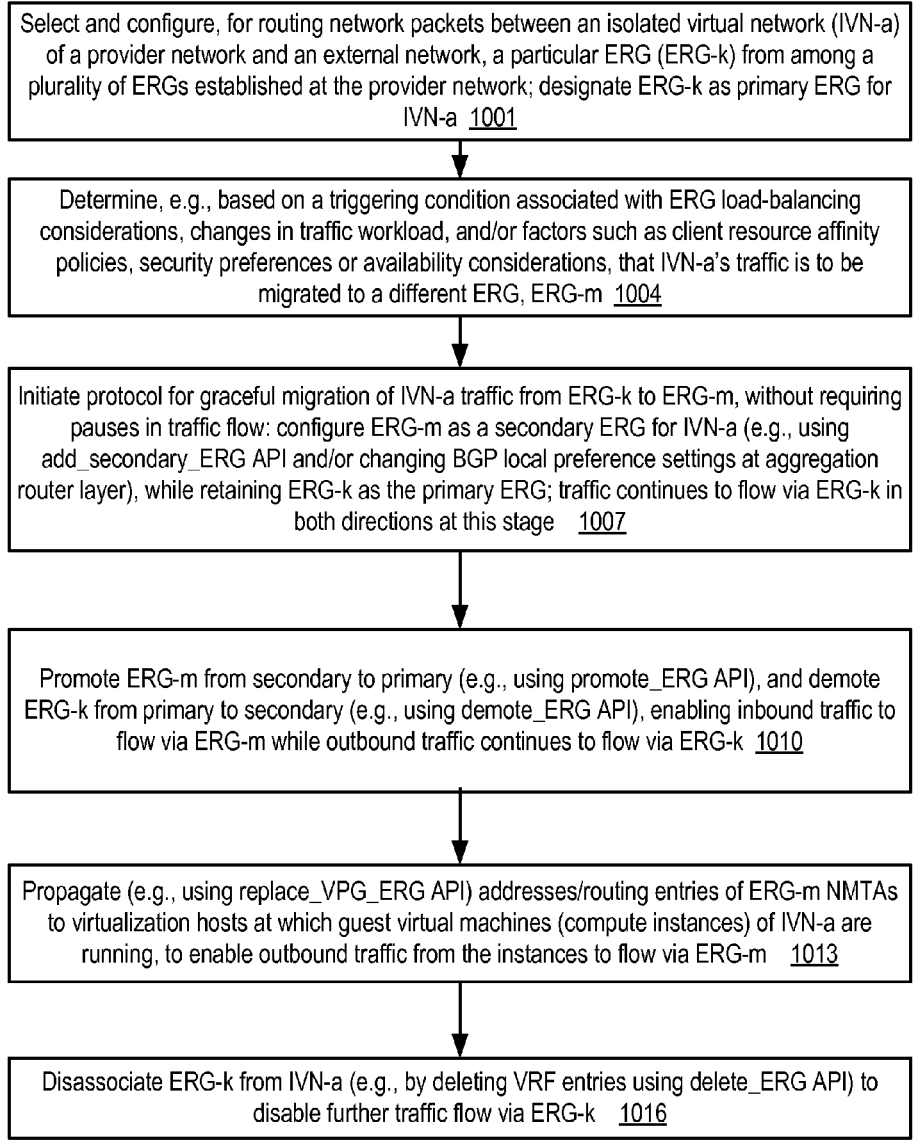
FIG. 10 is a flow diagram illustrating aspects of operations that may be performed to gracefully migrate network traffic associated with a particular client's IVN from one ERG to another, according to at least some embodiments.

FIG. 10 is a flow diagram illustrating aspects of operations that may be performed to gracefully migrate network traffic associated with a particular client's IVN from one ERG to another, according to at least some embodiments. As shown in element 1001, a particular ERG (ERG-k) may be selected as an initial primary ERG for connectivity between an IVN (IVN-a) of a provider network's virtual computing service (VCS) and a particular external network. ERG-k may be selected from among a plurality of ERGs that have been set up in the depicted embodiment, e.g., based on the expected workload of IVN-a, based on load balancing objectives with respect to the available ERGs, or based on other factors (including, for example, client resource affinity policies, security preferences, or availability preferences). In some embodiments, under certain conditions a new ERG may be provisioned in response to a request to establish connectivity between IVN-a and the external network, instead of using an existing ERG. The designation of ERG-k as the primary may result in the prioritized selection of ERG's devices for routing IVN-a's inbound and outbound traffic, even if additional non-primary ERGs are set up for IVN-a.

As shown in element 1004, at some point after ERG-k is designated for IVN-a's traffic, a connectivity manager may determine that subsequent traffic of IVN-a should be migrated to a different ERG, ERG-m. ERG-m which may be referred to as the migration destination ERG. Such a decision may be reached based on a variety of triggering conditions or considerations in different embodiments, such as changes to the workload associated with IVN-a or ERG-k, or imbalances detected between the workload of ERG-k and other ERGs. In at least some embodiments, some of the other factors mentioned above with respect to selecting the initial ERGs for IVNs may also or instead influence the selection of the migration destination ERG-m, such as client resource affinity polices, security preferences (e.g., a request by a client to enhance the security level of the client's networking infrastructure) and/or availability preferences.

A graceful migration protocol for transferring subsequent traffic between IVN-a and the external network to migration destination ERG-m may then be initiated (element 1007), comprising a set of configuration changes to enable the use of the migration destination, followed at least in some implementations by a second set of configuration changes to disable the use of the original primary ERG. The migration procedure may be designed such that there is little or no disruption to the client's traffic—i.e., as far as the client on whose behalf IVN-a is set up is concerned, the migration would have no discernible negative impact (although the performance achieved for the client's traffic after the migration may at least in some cases improve relative to the performance before the migration). In the embodiment depicted in FIG. 10, the migration may begin with the configuration of ERG-m as a secondary ERG for IVN-a. Such a configuration change (which may correspond to the invocation of an API such as add_secondary_ERG) may result in the setting up of additional VRF entries (or other routing table entries) at one or more aggregation layer routers and/or edge routers of ERG-m. However, using a selected technique (such as techniques that utilize BGP's local preference settings at the aggregation-layer routers) for prioritizing some routes over others, the inbound traffic may not yet be diverted to ERG-m at this stage. Instead, both inbound and outbound traffic may continue to flow using ERG-k.

In a next phase of the migration technique, indicated in element 1010, the roles of the primary and secondary ERGs may be exchanged. That is, ERG-m may be designated as a primary ERG, and ERG-k may be demoted to a secondary role. For example, in embodiments in which BGP or a BGP-variant is being used, local preference settings values for ERG-m routes may be increased, while local preference settings values for ERG-k routes may be decreased, at the aggregation layer routers involved. One or more APIs (such as switch_ERG_roles, promote_ERG, and/or demote_ERG) may be invoked to change the roles of the two ERGs in some embodiments. As a result of the change in role, inbound traffic may now begin to flow to IVN-a via ERG-m, and stop flowing through ERG-k. However, at this stage, outbound traffic may still continue via ERG-k rather than ERG-m, since the NMTA entries at the virtualization hosts of IVN-a have not yet been updated to include ERG-m's NMTAs.

As shown in element 10103, the NMTA address or routing entries at the virtualization hosts being used for IVN-a's GVMs may then be updated to reflect the NMTAs of ERG-m. As a result, outbound traffic from IVN-a may also begin to be routed via ERG-m. In some embodiments, an API such as replace_VPG_ERG may be invoked to change the NMTA-related entries. The inbound and outbound pathways that pass through ERG-k's resources may no longer be used for IVN-a's traffic at this stage. In a final step of the protocol, ERG-k may be disassociated from IVN-a in the depicted embodiment (e.g., by programmatically detaching IVN-a's VPG) (element 1016). An API such as delete_ERG may be used in some embodiments for this final step of the migration protocol. Over time, if needed, the traffic of IVN-a may be migrated to a different ERG, or back to ERG-k using a similar sequence of migration steps.

It is noted that in various embodiments, operations other than those illustrated in the flow diagram of FIG. 9 and FIG. 10 may be used to establish and use ERGs as described above. Some of the operations shown may not be implemented in some embodiments or may be implemented in a different order, or in parallel rather than sequentially. For example, in one embodiments, the outbound traffic may be migrated before the inbound traffic during a migration procedure similar to that shown in FIG. 10 (as opposed to migrating the inbound traffic first).

Use Cases

The techniques described above, of establishing independent groups of routing-related resources for connectivity between client networks and isolated virtual networks of a provider network may be useful in a number of scenarios. As more and more customer applications are transitioned to provider network environments, the need for secure flow of network traffic (e.g., via VPNs or using dedicated physical links) between customer-owned networks and resources within a provider network will tend to increase. In order to facilitate such growth in traffic flow, while supporting desired performance and availability characteristics, the amount of routing data shared or replicated among the networking devices at various layers of the provider network may have to be restricted. By configuring edge resource groups of the kind described above, it may become feasible to horizontally scale up the number of VPNs and direct connect connections supported. Furthermore, it may also become easier to manage control-plane versus data-plane tradeoffs with respect to certain types of routers at which the maximum number of distinct logical interfaces may be dependent on both the link aggregate group (LAG) membership count and the number of routing instances. By designating some edge resource groups for high-bandwidth-needs customers, and other edge resource groups for lower-bandwidth-needs customers, different categories of customers may be matched to appropriate resource groups without reaching the limit on logical interfaces. The graceful migration techniques discussed above may further enhance the ability of a provider network to adjust to changing client workloads without impacting client applications.

Illustrative Computer System

Figure 11:
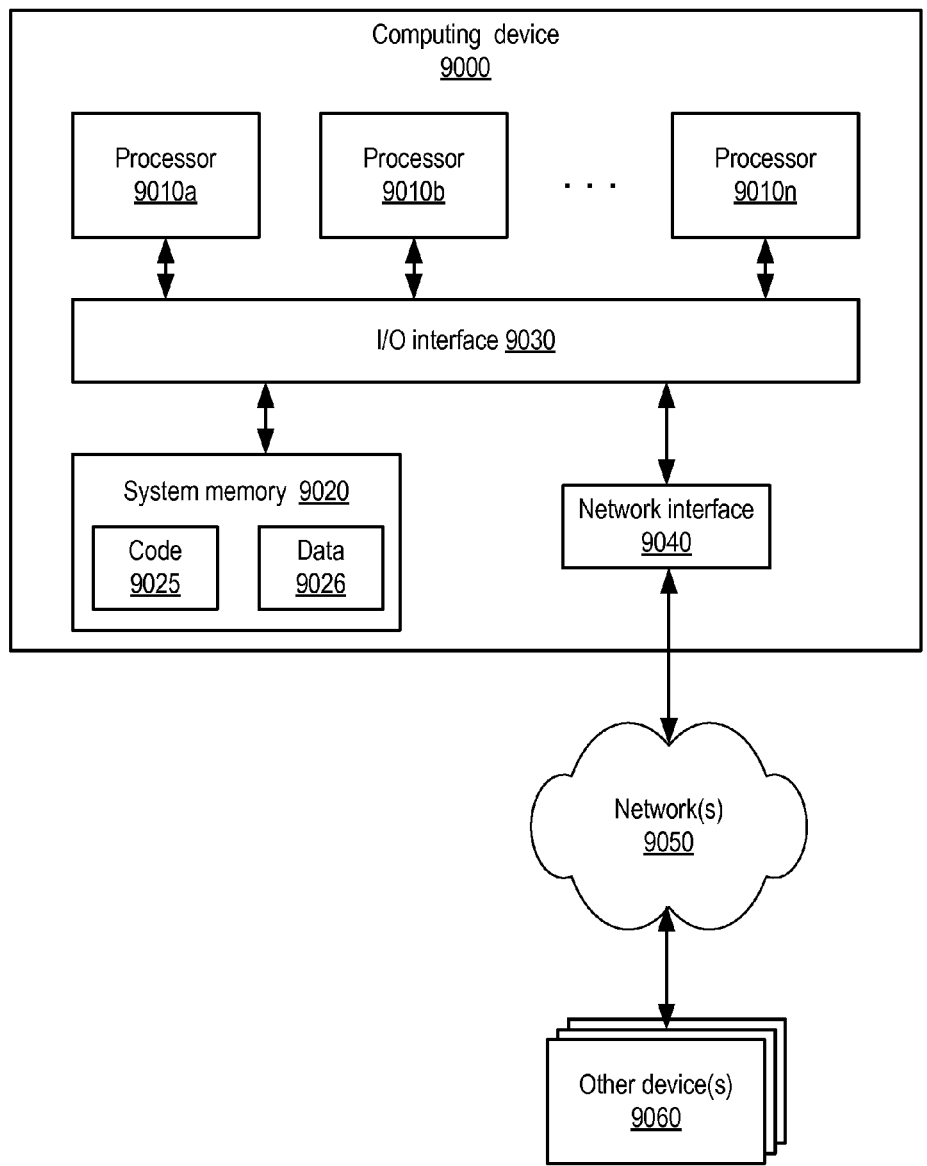
FIG. 11 is a block diagram illustrating an example computing device that may be used in at least some embodiments.

In at least some embodiments, a server that implements a portion or all of one or more of the technologies described herein, including the techniques to implement connectivity managers, edge resource group components, aggregation layer routers, virtualization hosts, and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a connectivity manager;
    wherein the connectivity manager is configured to:
        select, from among a plurality of edge resource groups (ERGs) of a provider network, wherein each ERG of the plurality of ERGs includes at least one edge router and at least one network marker translation agent (NMTA), a first ERG to be used for routing network packets between an isolated virtual network (IVN) of a client and a client network of the client;
        determine, based at least in part on collected metrics of network traffic between the IVN and the client network of the client, that a second ERG of the plurality of ERGs is to be used for routing network packets between the first IVN and the client network;
        implement a first set of configuration changes to enable connectivity between the IVN and the client network via the second ERG, wherein the first set comprises an assignment of a preference setting to one or more routing entries at an aggregation layer router associated with the client network; and
        initiate a second set of configuration changes to disable traffic flow via the first ERG between the first IVN and the client network.

2. The system as recited in claim 1, wherein the connectivity manager is configured to:
    establish, for network isolation of traffic between the client network and the IVN, one of: (a) a VPN (virtual private network) connection on behalf of the particular client or (b) a dedicated direct physical link.

3. The system as recited in claim 1, wherein the connectivity manager is configured to:
   prior to determining that the second ERG is to be used for routing network packets between the IVN and the client network, designating the first ERG as a primary ERG associated with a virtual private gateway (VPG) configured for the IVN, wherein the first set of configuration changes comprises designating the second ERG as a secondary ERG associated with the VPG.

4. The system as recited in claim 3, wherein the first set of configuration changes comprises:
   subsequent to designating the second ERG as the secondary ERG, (a) designating the second ERG as a primary ERG associated with the VPG and (b) designating the first ERG as a secondary ERG associated with the VPG.

5. The system as recited in claim 1, wherein the first set of configuration changes comprises modifying a routing entry at a particular virtualization host of the VCS, wherein the routing entry is used to direct network packets originating at a guest virtual machine instantiated at the particular virtualization host towards a particular NMTA of the second ERG.

6. A method, comprising:
   selecting, from among a plurality of edge resource groups (ERGs), wherein each ERG of the plurality of ERGs includes at least one edge router and at least one network marker translation agent (NMTA), a first ERG to be used for routing network packets between a first resource of a virtual computing service (VCS) of a provider network and a client network of a particular client;
   determining, based at least in part on detecting a triggering condition, that a second ERG of the plurality of ERGs is to be used for routing at least a subset of network packets between the first resource and the client network; and
   initiating a set of configuration changes to enable connectivity between the first resource and the client network via the second ERG.

7. The method as recited in claim 6, wherein the first resource comprises one or more compute instances of an isolated virtual network (IVN) established at the VCS on behalf of the particular client.

8. The method as recited in claim 7, further comprising:
   configuring, for network isolation of traffic between the client network and the provider network, one of: (a) a VPN (virtual private network) connection on behalf of the particular client or (b) a dedicated direct physical link.

9. The method as recited in claim 7, further comprising:
   prior to said determining, designating the first ERG as a primary ERG associated with a virtual private gateway (VPG) configured for the IVN, wherein the set of configuration changes comprises designating the second ERG as a secondary ERG associated with the VPG.

10. The method as recited in claim 9, wherein the set of configuration changes comprises:
    subsequent to designating the second ERG as the secondary ERG, (a) designating the second ERG as a primary ERG associated with the VPG and (b) designating the first ERG as a secondary ERG associated with the VPG.

11. The method as recited in claim 10, wherein designating the second ERG as the primary ERG comprises modifying a BGP (Border Gateway Protocol) local preference setting.

12. The method as recited in claim 6, wherein the set of configuration changes comprises modifying a routing entry at a particular virtualization host of the VCS, wherein the routing entry is used to direct network packets originating at a guest virtual machine instantiated at the particular virtualization host towards a particular NMTA of the second ERG.

13. The method as recited in claim 6, further comprising:
    initiating, subsequent to the set of configuration changes, a second set of configuration changes to disable connectivity between the IVN and the client network via the first ERG.

14. The method as recited in claim 6, wherein said detecting the triggering condition comprises determining that the rate of network traffic between the client network and the first resource collection has met a threshold criterion.

15. The method as recited in claim 6, wherein said detecting the triggering condition comprises determining that a utilization metric of the first ERG has met a threshold criterion.

16. A non-transitory computer-accessible storage medium storing program instructions that when executed on one or more processors implement a connectivity manager of a provider network, wherein the connectivity manager is configured to:
    select, from among a plurality of edge resource groups (ERGs) of the provider network, wherein each ERG of the plurality of ERGs includes at least one edge router and at least one network marker translation agent (NMTA), a first ERG to be used for routing network packets between a first resource collection of a virtual computing service (VCS) of the provider network and a client network of a particular client;
    determine, based at least in part on detecting a triggering condition, that a second ERG of the plurality of ERGs is to be used for routing at least a subset of network packets between the first resource collection and the client network; and
    initiate a set of configuration changes to enable connectivity between the first resource collection and the client network via the second ERG.

17. The non-transitory computer-accessible storage medium as recited in claim 16, wherein the connectivity manager is configured to:
    establish, for network isolation of traffic between the client network and the provider network, one of: (a) a VPN (virtual private network) connection on behalf of the particular client or (b) a dedicated direct physical link.

18. The non-transitory computer-accessible storage medium as recited in claim 17, wherein the connectivity manager is configured to:
    prior to determining that the second ERG is to be used for routing at least the subset of network packets between the first resource collection and the client network, designating the first ERG as a primary ERG associated with a virtual private gateway (VPG) configured for the first resource collection, wherein the first set of configuration changes comprises designating the second ERG as a secondary ERG associated with the VPG.

19. The non-transitory computer-accessible storage medium as recited in claim 18, wherein the set of configuration changes comprises:

subsequent to designating the second ERG as the secondary ERG, (a) designating the second ERG as a primary ERG associated with the VPG and (b) designating the first ERG as a secondary ERG associated with the VPG.

20. The non-transitory computer-accessible storage medium as recited in claim 16, wherein the set of configuration changes comprises modifying a routing entry at a particular virtualization host of the VCS, wherein the routing entry is used to direct network packets originating at a guest virtual machine instantiated at the particular virtualization host towards a particular NMTA of the second ERG.

* * * * *